US012682783B2

(12) United States Patent
Yadav et al.

(10) Patent No.: US 12,682,783 B2
(45) Date of Patent: Jul. 14, 2026

(54) VIRTUAL BROWSER CLOUD WORKSPACE FOR AN ONLINE HANDS-ON LEARNING PLATFORM

(71) Applicant: COURSERA, INC., Mountain View, CA (US)

(72) Inventors: Namit Yadav, Hillsborough, CA (US); Nedyalko Konstantinov Dyakov, Sofia (BG); Nadezhda Nikolova Petrova, Lovech (BG); Sergey Andreevich Shcherbina, Perm (RU); Ivaylo Petkov Tsankov, Gabrovo City (BG)

(73) Assignee: COURSERA, INC., Mountain View, CA (US)

( * ) Notice: Subject to any disclaimer, the term of this patent is extended or adjusted under 35 U.S.C. 154(b) by 895 days.

(21) Appl. No.: 17/821,751

(22) Filed: Aug. 23, 2022

(65) Prior Publication Data

US 2023/0066058 A1 Mar. 2, 2023

Related U.S. Application Data

(60) Provisional application No. 63/260,575, filed on Aug. 25, 2021.

(51) Int. Cl.
*G09B 19/00* (2006.01)
*G09B 5/02* (2006.01)

(52) U.S. Cl.
CPC ........... *G09B 19/0053* (2013.01); *G09B 5/02* (2013.01)

(58) Field of Classification Search
CPC .............................. G09B 19/0053; G09B 5/02
See application file for complete search history.

(56) References Cited

U.S. PATENT DOCUMENTS

2016/0134690 A1* 5/2016 Upton .................... H04L 51/10
709/204
2018/0332080 A1* 11/2018 Rajagopal ............... G06F 21/44

OTHER PUBLICATIONS

Barker et al., Using Containers to Create More Interactive Online Training and Education Materials, May 18, 2020 (Year: 2020).*

* cited by examiner

*Primary Examiner* — Dmitry Suhol
*Assistant Examiner* — Jose Angeles
(74) *Attorney, Agent, or Firm* — Brake Hughes Bellermann LLP

(57) ABSTRACT

A request may be received for a guided project teaching usage of a network-accessible resource, the guided project including an instruction video explaining the usage of the network-accessible resource. In response to the request, a virtual browser cloud workspace running on a containerized computation environment hosting a virtual browser and remote access software may be provided. An interactive learning environment may be provided that includes a virtual browser interactive window and an instructional window, and the instruction video may be provided within the instructional window. Using the remote access software, bidirectional communication may be provided between the virtual browser interactive window and the virtual browser while the virtual browser is accessing the network-accessible resource, to thereby provide control of the network-accessible resource at the virtual browser interactive window to complete the guided project in conjunction with the instruction video.

20 Claims, 10 Drawing Sheets

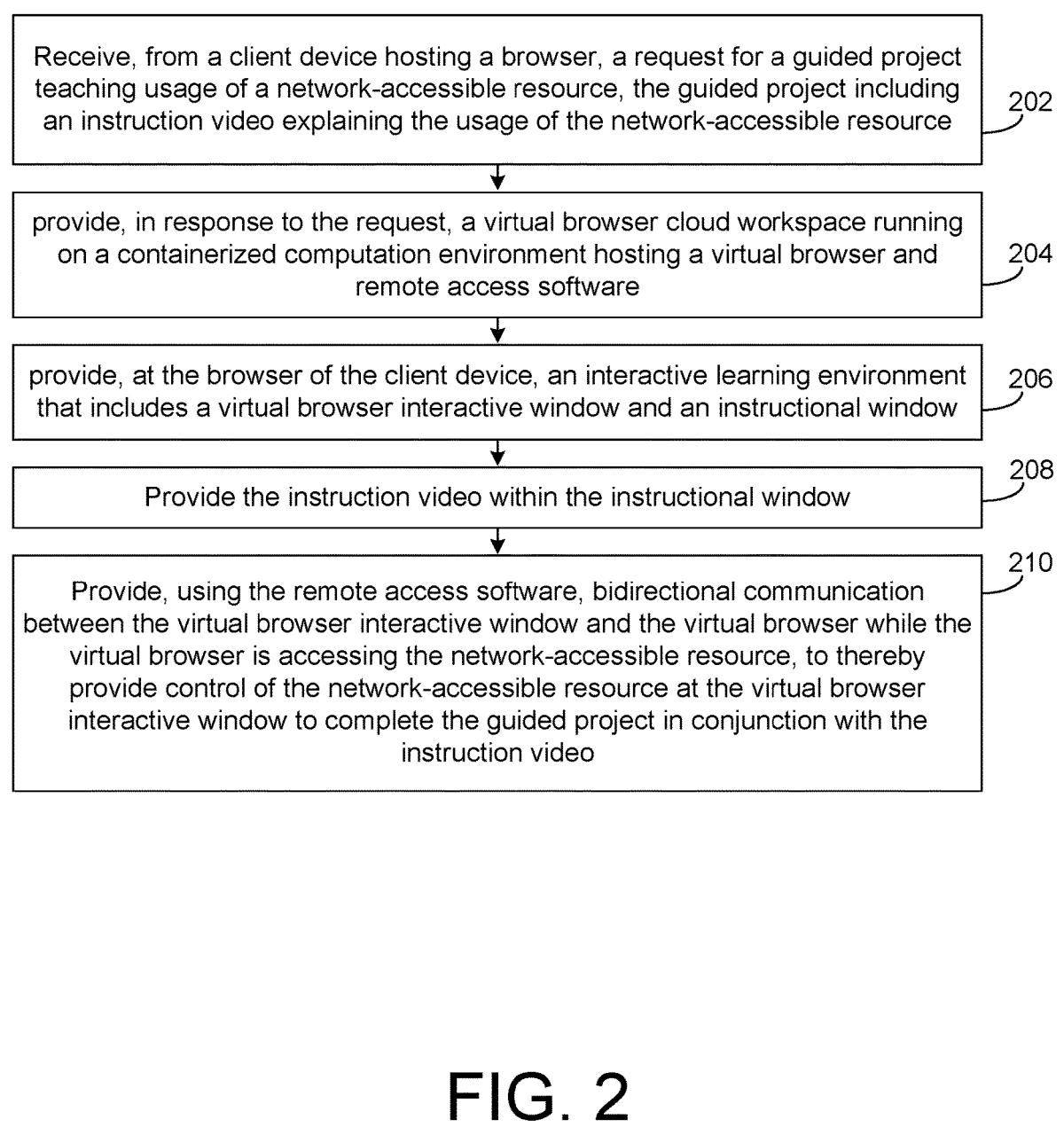

Receive, from a client device hosting a browser, a request for a guided project teaching usage of a network-accessible resource, the guided project including an instruction video explaining the usage of the network-accessible resource `202` provide, in response to the request, a virtual browser cloud workspace running on a containerized computation environment hosting a virtual browser and remote access software `204` provide, at the browser of the client device, an interactive learning environment that includes a virtual browser interactive window and an instructional window `206`

Provide the instruction video within the instructional window `208`

Provide, using the remote access software, bidirectional communication between the virtual browser interactive window and the virtual browser while the virtual browser is accessing the network-accessible resource, to thereby provide control of the network-accessible resource at the virtual browser interactive window to complete the guided project in conjunction with the instruction video `210`

FIG. 2

VIRTUAL BROWSER CLOUD WORKSPACE FOR AN ONLINE HANDS-ON LEARNING PLATFORM

CROSS-REFERENCE TO RELATED APPLICATION

This application claims priority to U.S. Provisional Application No. 63/260,575, filed on Aug. 25, 2021, and entitled "VIRTUAL BROWSER CLOUD WORKSPACE FOR AN ONLINE HANDS-ON LEARNING PLATFORM," the disclosure of which is incorporated by reference herein in its entirety.

TECHNICAL FIELD

This description relates to online learning systems.

BACKGROUND

Online learning platforms provide network-based educational opportunities for users, which would otherwise be inconvenient or unavailable for those users. As an addition to the benefits of the online learning platforms, the hands-on learning experience allows users to acquire skills through an active-learning approach. For example, a hands-on learning experience may include learning to write functional code.

For example, online learning platforms are often provided to thousands or millions of learners, using the Internet or other networks. Hands-on learning typically requires access to, or use of, corresponding types of software, which may not be available in a standardized or practical way for all of the learners to install and use. Even for learners with access to required software, it may be difficult or impossible for instructors or other administrators to oversee and manage installation and use of such software by all such learners, particularly if troubleshooting is required.

It is also not feasible, using conventional techniques, for an online learning platform provider to attempt to provide all such desired resources. For example, an online learning platform provider may attempt to provide remote access to required software, e.g., by using servers that may be accessed by the learners through a local browser. However, such an approach may be prohibitively expensive, and/or generally difficult to scale to provide all of the various types of hands-on learning experiences that large numbers of learners may wish to access.

SUMMARY

According to some general aspects, a computer program product may be tangibly embodied on a non-transitory computer-readable storage medium and may include instructions. When executed by at least one computing device, the instructions may be configured to cause the at least one computing device to receive, from a client device hosting a browser, a request for a guided project teaching usage of a network-accessible resource, the guided project including an instruction video explaining the usage of the network-accessible resource. When executed by the at least one computing device, the instructions may be configured to cause the at least one computing device to provide, in response to the request, a virtual browser cloud workspace running on a containerized computation environment hosting a virtual browser and remote access software. When executed by the at least one computing device, the instructions may be configured to cause the at least one computing device to provide, at the browser of the client device, an interactive learning environment that includes a virtual browser interactive window and an instructional window. When executed by the at least one computing device, the instructions may be configured to cause the at least one computing device to provide the instruction video within the instructional window. When executed by the at least one computing device, the instructions may be configured to cause the at least one computing device to provide, using the remote access software, bidirectional communication between the virtual browser interactive window and the virtual browser while the virtual browser is accessing the network-accessible resource, to thereby provide control of the network-accessible resource at the virtual browser interactive window to complete the guided project in conjunction with the instruction video.

According to other general aspects, a computer-implemented method may perform the instructions of the computer program product. According to other general aspects, a system may include at least one memory, including instructions, and at least one processor that is operably coupled to the at least one memory and that is arranged and configured to execute instructions that, when executed, cause the at least one processor to perform the instructions of the computer program product and/or the operations of the computer-implemented method.

The details of one or more implementations are set forth in the accompanying drawings and the description below. Other features will be apparent from the description and drawings, and from the claims.

BRIEF DESCRIPTION OF THE DRAWINGS

FIG. 2 is a flowchart illustrating example operations of the system of FIG. 1.

DETAILED DESCRIPTION

Figure 1:
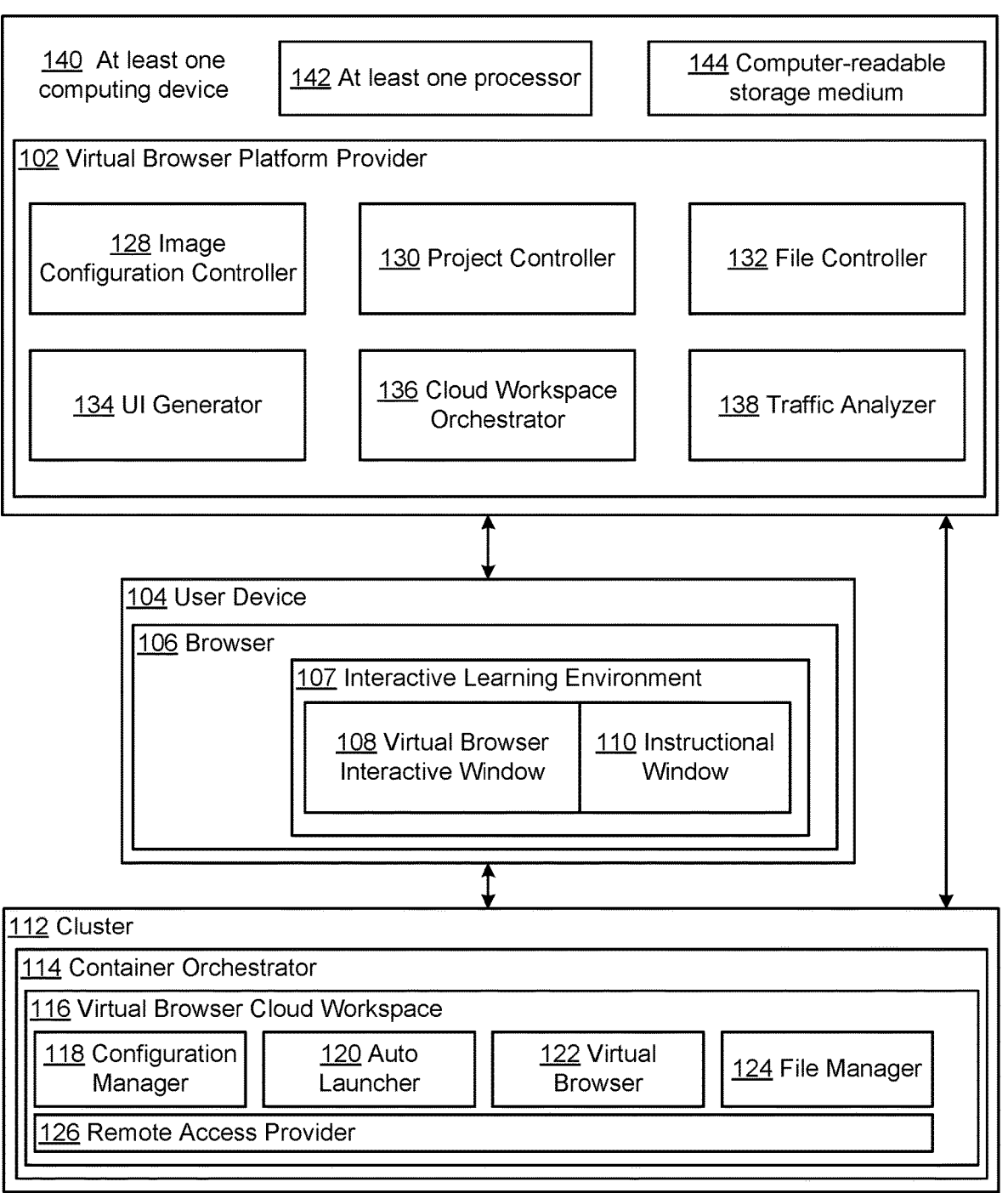
FIG. 1 is a block diagram of a system for interactive learning using a virtual browser.

In a massive hands-on learning platform, in addition to the learning materials provided by the platform, the learners may be provided with an interactive cloud workspace environment in which they can apply what they learn and solidify their acquired skills through practical experience. To facilitate these goals, the online hands-on learning platform may provide a system(s) and method(s) to provision a cloud workspace environment, wire network access between the learner and the environment, and provision access to all learning materials and resources needed for the topic.

One option is to provide a pre-configured full-blown virtual machine as a cloud workspace environment. When taking this approach, there may be a slow boot-up time if the cloud provider needs to provision computational, network, and storage resources from scratch (e.g., cold-boot). Limitations of computational resources that are provided during the initial configuration of the booting process of the virtual machine may be difficult to extend at run-time. Cost-ineffectiveness may occur, such when using a virtual machine (VM) based cloud workspace for launching a browser, because any given learner may not saturate the computational resources at maximum, which results in unused resources for which the platform owner must nonetheless pay. There may be limited options to attach network-based resources, which themselves may vary between cloud providers. Additionally, it may be difficult to update a pre-configured setup to account for potential security vulnerabilities or software improvements, e.g., when the cloud workspace configuration is saved as a monolithic configuration. As a final example, there may be limited mobility, as a VM based cloud workspace may be difficult to migrate if its configuration is bound to a specific cloud provider.

Nonetheless, many software tooling and programs that are used professionally are shifting towards cloud-based computing and web platforms. For example, the Rhyme platform (part of Coursera ecosystem) has many guided projects related to web applications which have very basic computational requirements, where fully functional virtual machines are not needed. Learners may only be required to open a browser and perform all related actions in the scope of a single (or small number of) website(s), e.g., to learn how to use spreadsheet functionalities, or to implement any function(s) provided via web access and/or in the context of a particular web application.

Consequently, as described herein, a virtual browser may be provided to provide a lightweight solution that is fast to boot-up and runs on shared computational resources (thereby dramatically improving cost effectiveness). Described techniques provide versatile options to attach various network-based resources, support a layered configurational architecture, and simplify the user experience to provide hands-on experiences for learning web applications and tooling. For example, virtual browser techniques described herein may be implemented using a lightweight containerized computational environment with an Internet browser installed and remote access software running on an abstract container orchestrator (which may be run, e.g., on any cloud or on-premise provider).

Conventional online learning platform providers typically provide access to instructional content, perhaps facilitated by live or recorded instructors. For example, such online learning platform providers may provide third-party content to learners, such as instructional videos. Online learning platform providers may also provider internally generated instructional content, e.g., by providing instructors with an ability to author instructional content in formats that are compatible with delivery modalities of the online learning platform provider. Online learning platform providers may provide and enable many other features and functions, such as providing tests/quizzes to learners (which may then be graded by instructors or others in conventional manners), tracking progress of learners through a course, and managing enrollment and other administrative duties. In short, conventional online learning platform providers may attempt to emulate classroom experiences in which learners observe an instructor of a course, and are tested with respect to the completeness and accuracy of their observations.

As referenced above, however, it is difficult for conventional online learning platform providers to enable hands-on learning in a practical manner. As used herein, hands-on learning generally refers to learning that requires a learner to have access to, and use, software that provides specific functionality, so that the learner may learn to use that functionality to obtain desired, specified results.

For example, a user may wish to learn to perform a specific technique(s) that is provided in the context of a website or a web application. For example, a website may provide photo-editing tools, tools for building a website, or tools for using a suite of document processing tools (e.g., spreadsheet, word processor, and presentation software). In each of these, additional resources may be required in order to learn the techniques in question. For example, in the case of using photo-editing tools, a particular type of photograph (e.g., having particular characteristics, or stored using a particular format) may be required.

In other examples, a user may wish to learn to write code in a specific programming language. The programming language may require a specific type of development environment, compiler, or other software. It is possible for an instructor to record a video, or broadcast a lecture, instructing learners with respect to writing code in the programming language, with an expectation that the learners will obtain all necessary software to use the programming language.

In practice, however, learners who, by definition, are novices with respect to the programming language, can not be expected to easily or correctly obtain and successfully install such required software. Further, the many learners who may wish to learn the programming language may each experience different types or degrees of difficulty in obtaining and installing the required software, thereby multiplying the difficulties an instructor or other administrator may experience in ensuring that the learners are able to proceed.

In these and many other scenarios, the virtual browser and related systems and techniques as described herein provide solutions to, and improvements over, the conventional techniques described above, and related conventional techniques. For example, described techniques may be used to provide a user with a virtual browser in an interactive, containerized environment in which all required resources are made available to the user. For example, in the examples above, a user learning to use a particular photo-editing web application may be provided with interactive access to the website in question, a suitable photograph to use in the learning process, and coordinated instructional material that walks the user through a synchronized process for editing the provided photograph as a means of learning to use the website in question.

Thus, in the following description, an online learning platform provides network-based educational opportunities for users, which would otherwise be inconvenient or unavailable for those users. As an addition to the benefits of the online learning platforms, the hands-on learning experience allows users to acquire skills through an active-learning approach. For example, as referenced above, a hands-on learning experience may include learning to write functioning code, or performing any functionality provided by a website, or web application.

In the following, a cloud workspace may refer to an interactive cloud environment in which learners experience hands-on learning with respect to specific learning topics and/or software. A cloud workspace example may include a full-blown virtual machine or a containerized environment (e.g., in which multiple containers are supported by a single, underlying virtual machine).

A cloud workspace configuration may refer to a pre-configured template from which a cloud workspace is created.

A guided project may refer to a bundle of instructional video materials, associated file resource(s), and a corresponding cloud workspace configuration.

A virtual browser cloud workspace may refer to a cloud workspace that runs on containerized computation environment hosting an internet browser installation, file transfer software, and remote access software.

A launch uniform resource locator (URL) may refer to a URL that is seeded in the cloud workspace configuration for the virtual browser cloud workspace used to open the provided link on cloud workspace boot-up.

A network file system may refer to a digital file system that is attached to a computational entity through local area network (LAN) or wide area network (WAN).

A remote access protocol may refer to a protocol that allows the user to interact and control a cloud workspace over the network (LAN or WAN).

A file transfer protocol may refer to a protocol that allows the user to exchange (upload/download) files from/to the Cloud Workspace over the network (LAN or WAN).

A containerized computational environment may refer to an isolated computational environment that runs on top of an operating system and facilitates process execution in limited context and operational space while sharing some of the underlying resources to utilize the host operational resources.

A container orchestrator may refer to a system that manages multiple computational hosts to abstract them in a uniform computational unit to host multiple containerized computational environments.

The above definitions are intended to facilitate understanding of the following description. Additional definitions and examples of the above and related terms are also provided below.

FIG. 1 is a block diagram of a system for interactive learning using a virtual browser. In the example of FIG. 1, a virtual browser platform provider 102 provides an interactive learning environment 107 executed on a user device 104 executing a browser 106. As shown, the interactive learning environment 107 includes a virtual browser interactive window 108 and an instructional window 110.

As referenced above, and described in more detail, below, the virtual browser interactive window 108 may be configured to provide a user with full, interactive control of any functionality of a website for which instructional content conveyed via the instructional window 110 is provided. For example, continuing the example above, the instructional window 110 may be used to provide pre-recorded video detailing techniques for using a photo-editing web application, while the virtual browser interactive window 108 may be used to provide interactions with the photo-editing web application itself. The interactive window 108 may be synchronized with the instructional window 110, e.g., the instructions may be recorded in the same environment that is provided in the interactive window 108. Consequently, the user may be provided with an ability to experience hands-on learning with respect to the photo-editing web application, while receiving coordinated instructions to facilitate such hands-on learning.

Advantageously, the interactive learning environment 107 may be provided using virtually any suitable type of the browser 106, which may be provided using any example of the user device 104 that is configured to run the browser 106. For example, the user device 104 may be any laptop, desktop, table, smartphone, or workstation computer running any operating system capable of providing the browser 106.

Consequently, it is not necessary for any user with browser access to install any new software to use the interactive learning environment 107 of FIG. 1. For example, the interactive learning environment 107 may be implemented as a new browser window or browser tab, in which the window or tab is divided into two resizable portions to provide the virtual browser interactive window 108 and the instructional window 110.

The virtual browser interactive window 108 may be configured to provide a virtual browser within a containerized environment deployed using a cluster 112. For example, the cluster 112 may represent one or more servers or other computing devices that have sufficient computing resources to execute such containerized environments, as described herein.

For example, the cluster 112 may represent a public or private cloud that is accessible by the virtual browser platform provider 102, and which may be used to execute a container orchestrator 114. As described in detail, below, e.g., with respect to FIG. 3, the container orchestrator 114 may be configured to deploy and coordinate a plurality of containers using the underlying resources of the cluster 112.

For example, in this way, a virtual browser cloud workspace 116 may be implemented as a container that is used to provide the virtual browser interactive window 108. That is, the virtual browser cloud workspace 116 may be configured as a container providing a discrete computing element configured with resources and capabilities used to enable and provide individual users with the types of virtual browser-based, hands-on learning described herein.

For example, the virtual browser cloud workspace 116 may be instantiated from an existing template or other configuration in a one-to-one correspondence with each user (e.g., learner). A configuration manager 118 may be used by the virtual browser platform provider 102 to reflect a desired parametrization of the virtual browser cloud workspace 116.

For example, the virtual browser cloud workspace 116 may be configured to provide access to a defined website or set of websites needed to implement the virtual browser interactive window 108. The configuration manager 118 may thus be configured to associate the virtual browser cloud workspace 116 with the relevant website(s) and provision and use an auto launcher 120 to automatically launch a virtual browser 122 with a selected website, in full screen mode, and/or with any other preference or security-related features enabled.

In other words, the virtual browser cloud workspace 116 may be understood to represent a computing environment provided in the context of an operating system, e.g., a shared operating system as described below with respect to FIG. 3. As with any suitable operating system, a browser may be installed and executed, which, in the case of FIG. 1, is referred to as the virtual browser 122 because it is provided and accessed remotely from within the virtual browser interactive window 108. By coupling the virtual browser 122 with the auto launcher 120, the configuration manager 118 may be used to provide a prepared, customized version of the virtual browser interactive window 108 for each learner and each associated hands-on learning session.

A file manager 124 may be configured to provide access to any file or other resource associated with a guided project for which the virtual browser cloud workspace 116 was created. For example, as the virtual browser 122 may be implemented as a fully functional browser, a user accessing the virtual browser cloud workspace 116 through the virtual browser interactive window 108 may interact with the virtual browser 122 to use the file manager 124 and access any available file. For example, as referenced above, a guided project for learning to use a photo-editing website may include image files for photo-editing.

As described below, a file required for a guided project may be stored using the virtual browser cloud workspace 116, or the container orchestrator, the cluster 112, or any network storage location accessible from the virtual browser cloud workspace 116. Consequently, even though the virtual browser cloud workspace 116 and the virtual browser interactive window 108 are unique to a particular learner experiencing the guided project, a single file may be shared among many different users. For example, a file may be designated read-only and provided to many different users, so that network storage resources may be used efficiently and without excessive copying of a single file.

Finally with respect to the virtual browser cloud workspace 116, a remote access provider 126 may be configured to facilitate and enable interactions between the virtual browser interactive window 108 and the virtual browser cloud workspace 116, e.g., with the virtual browser 122. For example, the remote access provider 126 may be configured to enable bidirectional communications between the virtual browser 122 and the virtual browser interactive window 108. For example, the remote access provider 126 may provide media output from the virtual browser 122 to the virtual browser interactive window 108, and may receive input control actions from the virtual browser interactive window 108 to use in controlling operations of the virtual browser 122.

In example implementations, the remote access provider 126 may be provided using existing remote access protocols and associated software. In some implementations, as described in detail below, e.g., with respect to FIGS. 3 and 6, a remote desktop proxy may be used to establish and mediate the bidirectional communications between the virtual browser cloud workspace 116 and the virtual browser interactive window 108, e.g., using network location and authentication credentials provided by the cloud workspace orchestrator 136.

Figure 4:
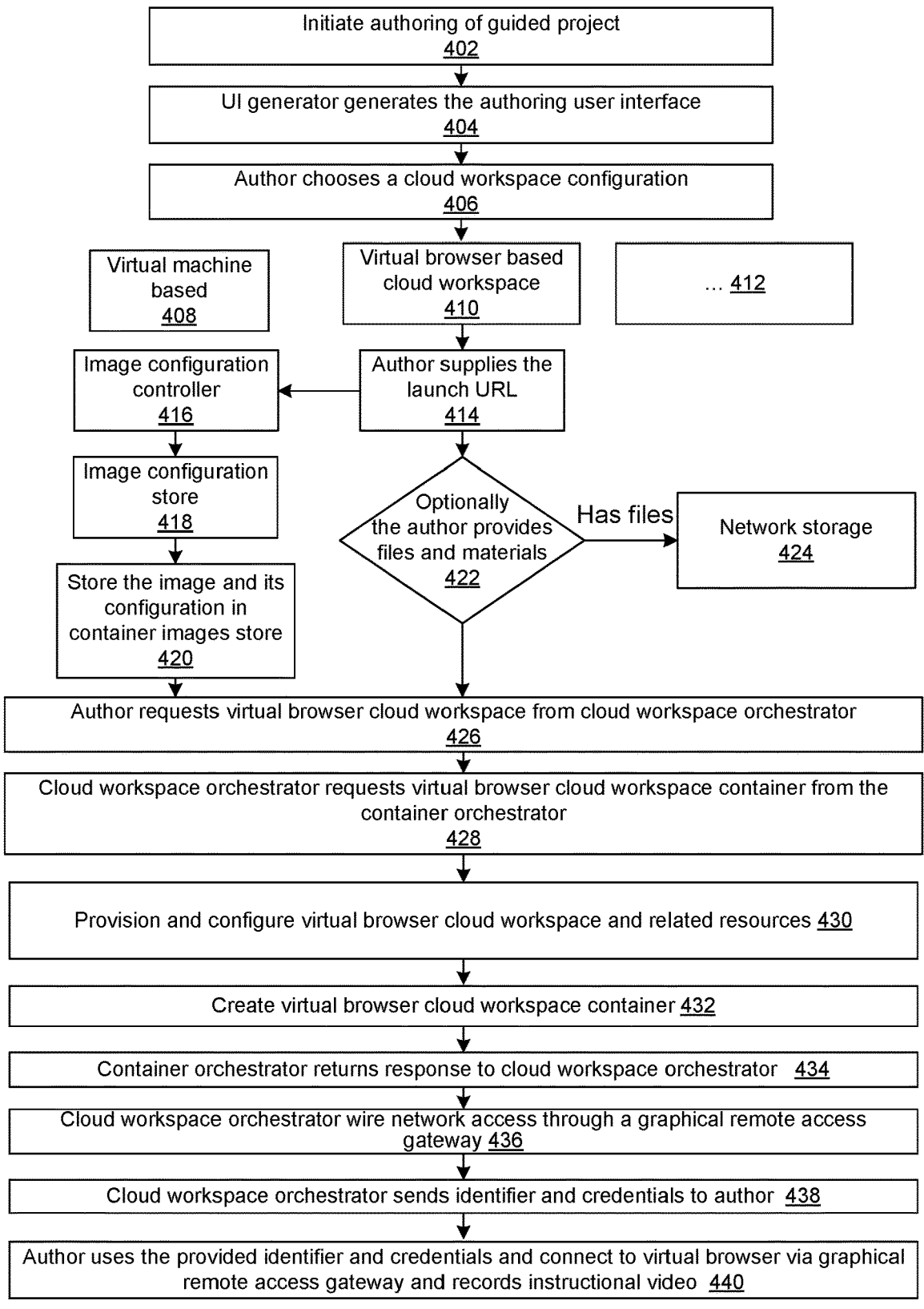
FIG. 4 is a flowchart illustrating the authoring of a guided project using the systems of FIGS. 1 and 3.

Thus, as described in more detail with respect to FIG. 4, the virtual browser platform provider 102 may be configured to enable authoring of a guided project simply by receiving a relevant URL(s), recorded instructional material, and any associated resources (e.g., files). Then, the virtual browser platform provider 102 may instantiate and provide the virtual browser cloud workspace 116 for any number of learners wishing to experience the resulting guided project, so that the learners may each use a local browser (i.e., the browser 106) to experience the interactive learning environment 107, as described herein.

To provide these and other features, the virtual browser platform provider 102 may include an image configuration controller 128 that may be used to construct and access one or more container images providing a basis for generating the virtual browser cloud workspace 116. In other words, as described in detail below with respect to FIGS. 3-6 and FIG. 10, a container image and associated container configuration may refer to or utilize a pre-configured container template. Use of such a template enables fast and efficient generation of a particular virtual browser cloud workspace, such as the virtual browser cloud workspace 116, for a particular guided project.

For example, a register or store of a plurality of different pre-configured container images may be created. When an author creates a new guided project, the image configuration controller 128 may select an appropriate, corresponding container image to use in conjunction therewith.

For example, a project controller 130 may be used to facilitate authoring and control of each guided project, in conjunction with a file controller 132 and a user interface (UI) generator 134. For example, as described in detail with respect to FIG. 4, during authoring of a new guided project, the project controller 130 may determine various relevant factors, such as a type of browser to be used, or a number and type of file(s) (and associated access requirements) to be associated with the new guided project.

The project controller 130 may then determine an appropriate container image using the image configuration controller 128. The project controller 130 may further instruct the file controller 132 to establish required storage locations and associated access parameters.

The UI generator 134 may be configured to provide an author of the guided project with an ability to provide a relevant URL(s) and record related instructional material, to be provided in the context of the guided project using the instructional window 110. For example, after initiating the recording process, the author may simply proceed to the relevant website and record interactions with the website along with an associated voice-over explaining required steps. The resulting instructional recording may be stored using the project controller 130, and associated with the guided project using the project controller 130.

At a later time, a learner may experience the guided project simply by accessing the virtual browser platform provider 102 using the browser 106. Then, a cloud workspace orchestrator 136 of the virtual browser platform provider 102 may be configured to instantiate the virtual browser cloud workspace 116 within the container orchestrator 114, using the appropriate container image as determined by the image configuration controller 128, and otherwise configured according to the project controller 130 and the file controller 132. Consequently, the virtual browser cloud workspace 116 may be provided with appropriately configured instances of each of the various modules 118-126 described above. As a result, the learner may immediately be provided with the interactive learning environment 107, e.g., by accessing the virtual browser cloud workspace 116 within the virtual browser interactive window 108 and viewing the relevant instructional material within the instructional window 110, as provided by the project controller 130 and the UI generator 134.

Finally with respect to the virtual browser platform provider 102, a traffic analyzer 138 may be configured to analyze network traffic to and from the virtual browser cloud workspace 116. In particular, the traffic analyzer 138 may be configured to ensure that network traffic from the virtual browser interactive window 108 is restricted to specific websites or other network resources that are relevant to the guided project being experienced by the user in the interactive learning environment 107, and to ensure that the network traffic is consistent with the guided project.

As a result, the traffic analyzer 138 may help ensure a quality of a user experience with respect to a guided project. For example, a learner who accidentally or inadvertently accesses an incorrect website or portion thereof may experience confusion with respect to understanding the subject matter of the guided project.

Additionally, the traffic analyzer 138 may be configured to provide security with respect to use of resources of the virtual browser cloud workspace 116, and of the cluster 112. For example, a malicious or otherwise illicit user may attempt to use resources of the cluster 112 to process workloads unrelated to a guided project. In addition to monitoring usage of specific websites and network resources as noted above, the traffic analyzer 138 may help in preventing such illicit uses by monitoring a quantity of traffic (and/or limit the network destinations) experienced by each virtual browser cloud workspace of the container orchestrator 114, including the virtual browser cloud workspace 116.

In the simplified example of FIG. 1, the virtual browser platform provider 102 is illustrated as being executed using at least one computing device 140, which is illustrated as including at least one processor 142 and a non-transitory computer-readable storage medium 144. It will be appreciated that the at least one computing device 140 may represent multiple computing devices in communication with one another. In some examples, the at least one computing device 140 may represent a server and/or a cloud-based virtual machine. In some implementations, the at least one computing device 140 may be part of the cluster 112, and/or the virtual browser platform provider 102 may be provided using the cluster 112.

In FIG. 1, the virtual browser platform provider 102 and the container orchestrator 114 are illustrated as having various separate component or modules, each of which may have various sub-modules or related modules that are not explicitly illustrated in the simplified example of FIG. 1. In various other examples, however, the virtual browser platform provider 102 and the container orchestrator 114, or modules or sub-modules thereof, may be implemented at least partially together, such as when aspects of network traffic analysis of the traffic analyzer 138 are provided locally at the virtual browser cloud workspace 116. Similarly, various sub-modules may be combined, or may have their functions divided for separate implementation.

FIG. 2 is a flowchart illustrating example operations of the system of FIG. 1. In the example of FIG. 2, operations 202-210 are illustrated as separate, sequential operations. In various implementations, the operations 202-210 may include sub-operations, may be performed in a different order, may include alternative or additional operations, or may omit one or more operations. Further, in all such implementations, included operations may be performed in an iterative, looped, nested, or branched fashion.

In the example of FIG. 2, a request may be received, from a client device hosting a browser, for a guided project teaching usage of a network-accessible resource, the guided project including an instruction video explaining the usage of the network-accessible resource (202). For example, the virtual browser platform provider 102 may receive a request for a guided project from a learner at the user device 104 that provides the local browser 106. As mentioned above, and described in more detail, below, the instruction video and other files related to the requested guided project may be managed by the project controller 130 and/or the file controller 132. The network-accessible resource may include, e.g., a website or web application specified by its URL.

In response to the request, a virtual browser cloud workspace running on a containerized computation environment hosting a virtual browser and remote access software may be provided (204). For example, the image configuration controller 128 and the cloud workspace orchestrator 136 of FIG. 1 may instantiate and run the virtual browser cloud workspace 116 using the container orchestrator 114 on the cluster 112. As shown and described, the virtual browser cloud workspace 116 may include the virtual browser 122 and the remote access provider 126.

At the browser of the client device, an interactive learning environment may be provided that includes a virtual browser interactive window and an instructional window (206). For example, the interactive learning environment 107 may be provided at the browser 106 that includes the virtual browser interactive window 108 and the instructional window 110. For example, the interactive learning environment 107 may be provided as a separate tab or window of the browser 106.

Accordingly, the instruction video may be provided within the instructional window (208). For example, the separate tab or window of the browser 106 may stream the instruction video from the virtual browser platform provider 102, e.g., from the project controller 130 or the file controller 132.

Using the remote access software, bidirectional communication may be provided between the virtual browser interactive window and the virtual browser while the virtual browser is accessing the network-accessible resource, to thereby provide control of the network-accessible resource at the virtual browser interactive window to complete the guided project in conjunction with the instruction video (210). For example, the learner at the user device 104 may interact with the virtual browser 122 from within the virtual browser interactive window 108, to thereby control a website or web application as if the learner had a direct connection thereto from the local browser 106. By simultaneously (e.g., in a side-by-side setting) watching the instruction video within the instructional window 110, the learner (and many other learners working in parallel on separate devices using separate virtual browser cloud workspaces) may be walked through the guided project in a fast, intuitive, and consistent manner.

Thus, FIGS. 1 and 2 provide a side-by-side hands-on learning experience for web-based application education. Described techniques provide a quick and consistent way of setting up a virtualized browser environment, authoring (e.g., recording, editing and packaging) video instructions, providing learning materials and packaging the above in an interactive hands-on experience. Described techniques provide a way to automate, provision and distribute the packaged hands-on learning experience to learners in a consistent, easy-to-use and mass scale manner. Each of the learner's virtualized browser environments receives the exact setup the author intended during the authoring phase, including, e.g., a browser with a specific version and configuration. The virtual browser 122 may be configured to be auto-launched by the auto-launcher 120 with the relevant web-based application pre-loaded, and relevant learning materials may be auto-attached to the virtual browser cloud workspace 116 while the learner receives graphical remote access to the virtualized browser environment.

Figure 3:
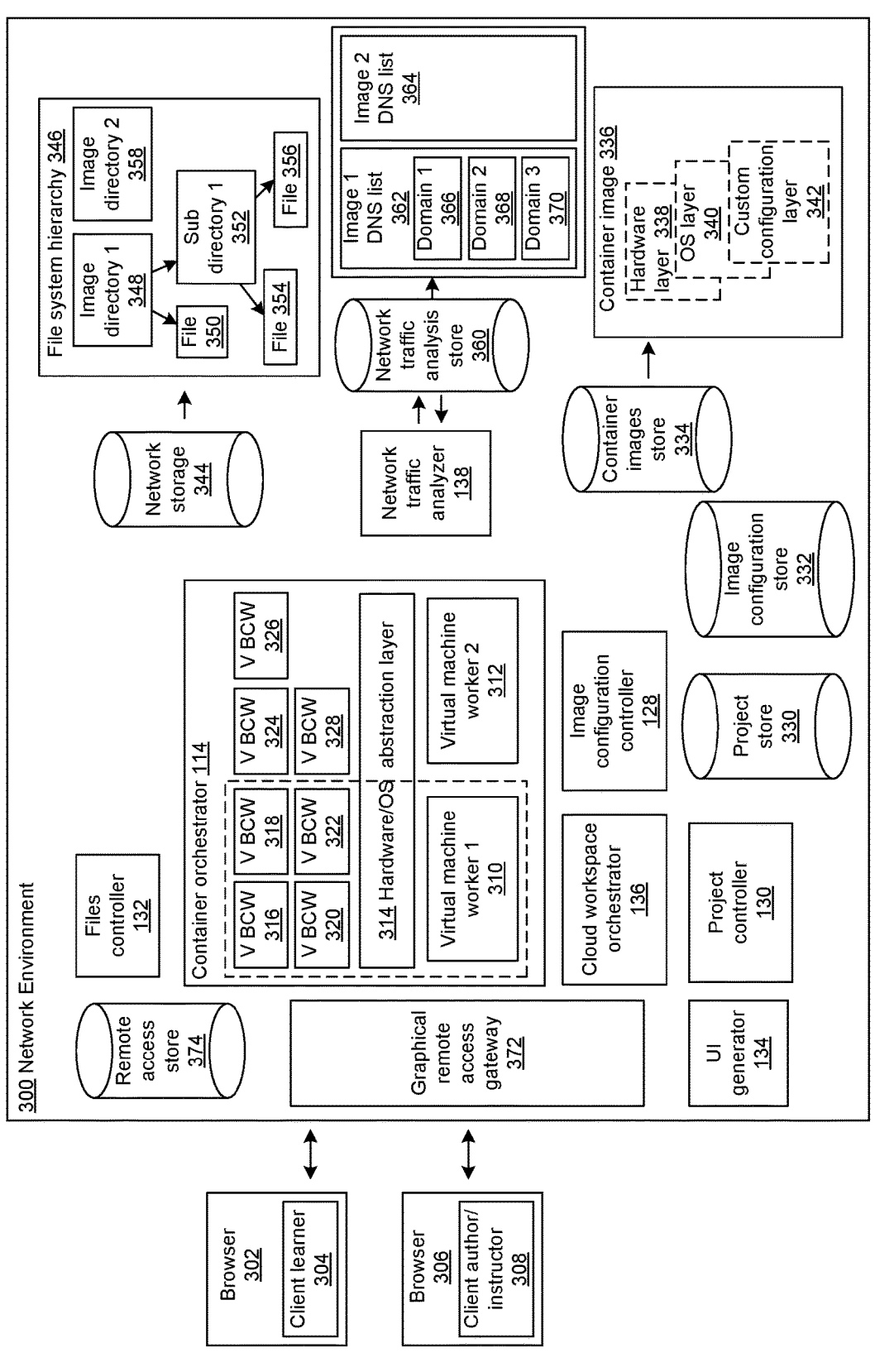
FIG. 3 is a more detailed example implementation of the system of FIG. 1.

FIG. 3 is a more detailed example implementation of the system of FIG. 1. In the example of FIG. 3, elements included from FIG. 1 are numbered identically as in FIG. 1, but may represent a more specific instance of each corresponding element, as described below.

FIG. 3 illustrates that a network environment 300 may be accessed by either a browser 302 used by a learner 304, or by a browser 306 used by an author (e.g., instructor) 308. For example, the network environment 300 may include a public cloud provider or an on-premise provider, e.g., providing the cluster 112 of FIG. 1. The network environment 300 may include, or be part of, a larger online learning environment.

In the example of FIG. 3, the container orchestrator 114 is illustrated as including a virtual machine worker 310 and a virtual machine worker 312, as well as a hardware/operating system (OS) abstraction layer 314. For example, the virtual machine worker 310 and the virtual machine worker 312 may represent organized collections of underlying hardware resources, e.g., of the cluster 112 of FIG. 1, which are designed to be easily allocated into individual virtual browser cloud workspaces 316, 318, 320, 322 (for the virtual machine worker 310), and virtual browser cloud workspaces 324, 326, 328 (for the virtual machine worker 312), using the same abstraction layer 314. It will be appreciated that various implementations have many different numbers of virtual browser cloud workspaces and underlying virtual machine workers, and the above-referenced configuration of FIG. 3 is non-limiting and intended merely to provide explanation and illustration of example uses of the container orchestrator 114.

For example, as indicated by the dashed box in FIG. 3, the virtual machine worker 310 may be provided with sufficient resources (e.g., processing, memory, storage) to provide a common, shared platform to support a defined number of virtual browser cloud workspaces 316, 318, 320, 322. The abstraction layer 314 may be shared by the virtual machine worker 310 and each of the virtual browser cloud workspaces 316, 318, 320, 322.

Accordingly, when the learner 304 requests a new guided project, a corresponding (e.g., pre-warmed, pre-configured) virtual browser cloud workspace may be provided, without having to provision an entire virtual machine. That is, as described herein, a single virtual machine may require its own operating system, file system, application(s) installation, and various other components. In FIG. 3, the virtual machine workers 310, 312 may each be defined as providing a maximum or upper limit of computing resources, which are configured to be accessed via the abstraction layer 314, so that individual virtual browser cloud workspaces 316-328 may be allocated in a faster, more flexible manner, and on an as-needed basis.

In FIG. 3, intended to illustrate a single example in which virtual worker resources are shared by a defined number of virtual browser cloud workspaces, it may be the case that the virtual machine worker 310 and the virtual machine worker 312 are provided with sufficient resources to support four virtual browser cloud workspaces each, so that the virtual machine worker 310 is supporting a maximum available number of virtual browser cloud workspaces 316-322, while the virtual machine worker 312 is currently supporting the three virtual browser cloud workspaces 324-328, and has the ability to support an additional virtual browser cloud workspace.

In other examples, the virtual machine workers 310, 312 may be configured to support many more virtual browser cloud workspaces each, e.g., 30, 50, or more. Additionally, of course, additional virtual machine workers may be allocated, as well, each supporting a defined number of virtual browser cloud workspaces. In this way, the system of FIG. 3 may easily scale up or down for use with an intended or desired number of authors/learners, in a manner that efficiently uses available resources and provides a balance between a computational load(s) imposed by the authors/learners and a cost-effective utilization of available computing resources.

Further in FIG. 3, the project controller 130 may be provided with a project store 330. For example, as referenced above, the project store 330 may be used to store instructional videos and related content for a plurality of guided projects, as provided by authors such as the author 308.

Similarly, the image configuration controller 128 may be provided with an image configuration store 332 that stores configuration data specific to individual guided projects. A container images store 334 may be configured to store a plurality of container images, illustrated as a container image 336 in FIG. 3, that may be parameterized by relevant aspects of the image configuration store 332 to obtain a virtual browser cloud workspace configuration for a specific guided project.

In other words, the container image 336 represents a more generic configuration of a container that may be used to instantiate a virtual browser cloud workspace for a specific guided project, using the corresponding configuration data of the image configuration store 332. As shown, the container image 336 may include a hardware layer 338, an OS layer 340, and a customer configuration layer 342. That is, the layers 338, 340, 342 may be understood to represent particular configurations or uses of underlying resources of the abstraction layer 314 and the appropriate one of the virtual machine workers 310, 312. Different versions of the container image 336 may be constructed using the image configuration controller 128, based on anticipated needs with respect to, e.g., different operating systems or browser versions to be supported.

As described above, the project controller 130 may initiate a creation of virtual browser cloud workspaces 316-328 by instructing the cloud workspace orchestrator 136. The cloud workspace orchestrator may use the information from the image configuration controller 128 and its corresponding image configuration store 332, container images store 334, and the container orchestrator 114 to create a virtual browser cloud workspace, e.g., for the needs of authoring instructional recordings. Thus, the system of FIG. 3 may easily scale to support many different use case scenarios. More detailed examples illustrating the use of the cloud workspace orchestrator to instantiate a particular virtual browser cloud workspace for a requested guided project are provided below, e.g., with respect to FIGS. 4-6.

Further in FIG. 3, file controller 132 may be configured to manage network storage 344, e.g., using a defined file system hierarchy 346. In the example of FIG. 3, the file system hierarchy 346 includes an image directory 348 specifying a file 350, as well as a sub-directory 352 that specifies a file 354 and a file 356. A separate image directory 358 is also illustrated.

Thus, FIG. 3 illustrates that any desired file system hierarchy may be used in the network storage 344, as configured using the file controller 132. Additional example details of the network storage 344 are provided below, e.g., with respect to FIG. 7.

The network traffic analyzer 138 is illustrated as having access to a network traffic analysis store 360. As shown, the network traffic analysis store 360 may store a plurality of images, illustrated in the example of FIG. 3 as including a domain name system (DNS) DNS list 362 and a DNS 364. As shown, the DNS list 362 specifies a domain 366, a domain 368, and a domain 370. Of course, the DNS list 364 may include corresponding domains, as well, and additional DNS lists may be specified.

As referenced above, and described in additional detail, below, the various DNS lists may be dynamically gathered by the traffic analyzer 138 during authoring of instruction videos by the author 308, to be later used to traffic shape the network traffic of the learner 304 and restrict the learner 304 to a specific whitelisted set of domains. This approach improves the security and limits the malicious exposure of running described systems in a shared on-premise or/and cloud provider environment as described herein, and prevents users from taking potentially harmful actions. In addition, described techniques ensure that legitimate learners are restricted from inadvertently visiting incorrect or non-relevant websites, which would disrupt the learning experience.

FIG. 3 also illustrates a graphical remote access gateway 372 that leverages a remote access store 374 to enable remote access control of any of the virtual browser cloud workspaces 316-328. As described in additional examples of FIGS. 5, 6, 8, and 9, the graphical remote access store 374 may be configured to store, e.g., network information, remote access protocol information, file transfer configuration(s), connection identifiers and credentials for each user, such as the learner 304, so as to automatically and dynamically establish and maintain a unique, secure connection between the learner 304 and a corresponding virtual browser cloud workspace for a particular guided project.

FIG. 4 is a flowchart illustrating the authoring of a guided project using the systems of FIGS. 1 and 3. In the example of FIG. 4, an author may initiate authoring of a guided project (402). As described herein, the authoring experience generally deals with the creation and customization of the interactive virtual browser cloud workspace environment, as well as providing relevant learning materials (e.g., digital files) that may be used during the learning experience. In addition to the virtual browser cloud workspace customization, the authoring part includes the recording of the video instructions that will be later used as instructions in the learning experience.

Further in FIG. 4, the UI generator 134 generates an authoring user interface (UI) (404), e.g., as a web page. The authoring process may be performed within a local browser, without the need for additional software or plug-ins. In some examples, the authoring UI may include multiple authoring options, so that the author is able to choose a desired cloud workspace configuration (406).

For example, available choices may include a virtual machine based option (408), a virtual browser cloud workspace option (410), or other options (412). For example, a virtual machine based option may provide an author with a capability of configuring a full virtual machine, with a specific operating system, desktop environment, and associated file system with any desired components installed thereon. As referenced above, such an approach may provide a high degree of configurability, but may take longer and may consume unnecessary resources, as compared to the virtual browser cloud workspace option. For example, the author may be required to choose an operating system (e.g., Linux or Windows), which may require separate licenses. The author may be required to configure a browser to include with the operating system in the virtual machine environment.

For example, the author may be required to configure an internet browser icon on the a cloud workspace main screen (e.g., desktop) and provide instructions to learners as to how to open the browser to a desired URL. Since the author has the freedom to choose the method for providing the instructions, this approach may create discrepancies in the user experience between different guided projects. In other examples, it is possible to configure a start-up system, e.g., an auto-start-up procedure for the internet browser that provisions a launch URL, but this may be a complex process that may also vary between operating systems and browsers.

If additional file materials are used, the author may be required to configure a file structure and hierarchy, upload the files and provide instructions to the learners to locate and navigate the files. Since the author has the freedom to choose the method for providing such instructions, this approach may also create discrepancies in the user experience that vary between different guided projects. Additionally, different operating systems use different navigation systems for file structures, which may be challenging for some learners who are not familiar with the underlying operating system navigation. Further, the additional file materials may need to be replicated as part of the learners' cloud workspaces, which may consume significant resources, particularly when the files are very large (e.g., as in the case of machine learning or data analysis topics).

A resulting, customized cloud workspace configuration, in a virtual machine cloud workspace type, may include a full snapshot of the storage and additional configuration, which may be time consuming. Further, a virtual machine-based cloud workspace may be required from the cloud workspace orchestrator to record the authored video materials, which may require full-blown virtual machine creation, allocation of computing, memory and storage resources and full provisioning of an operating system, all of which may also be time consuming process.

For the above and other reasons, in the case of web-based application education, the author may choose the virtual browser option (410), because it requires fewer steps for customization and configuration. For example, the author may make the choice by clicking on a UI button with title "Create a Project" for a web-based application. Once the author chooses this option, the client side of the system may simply record the author's choice in a browser local storage, as described below, and provide a second screen generated by the UI generator 134 that includes a web form for providing meta information for the hands-on learning experience (guided project). The meta information may include, without limitation, a name of the guided project, a description of the guided project that will be provided to learners, and a language of the guided project. Once the author inputs the information into the web form through the web browser, the client side of the system may proceed to append that information to the choice of the virtual browser template for the guided project.

Then the UI generator 134 may generate a new web page with a web form for the author to provide the entry point of the web-based application, e.g., a launch URL (414), in a manner that does not vary for underlying OS or browser configurations. For example, an internet domain and additional information may be received. For example, the author may wish to provide instruction with respect to a particular website. The website may be associated with multiple domains, but the instruction may be initiated with respect to a particular URL, referred to herein as the launch URL. Once the author inputs the desired URL into the presented web form, the client side of the system appends that information to the rest of the input information for the guided project.

Using the launch URL, the image configuration controller 128 (416) may access the image configuration store 332 (418) to parameterize a desired container image and its associated configuration within the container images store 334 (420). In addition to the launch URL, the author may optionally provide additional files and other materials (422), which may be stored using the network storage (424) as described herein.

For example, the author may be presented with an additional web page generated by the UI generator 134 (404) that provides an option for the author to upload digital files which will be later used as learning materials in the guided project. The web page may provide a special input called "Upload Files" that triggers local browser functionality to choose digital files from the author's user device. Once the author chooses the files, the client side of the system may send a HTTP request to the server side of the system to upload the desired digital files. The file controller 132 (e.g., a server-side component dealing with digital file uploads, as explained above) may receive the incoming payload for the chosen files and make a subsequent HTTP request to store the files into the network storage 344. An example of network storage may include a distribution Network File System (NFS), any block-device storage system (e.g., digital storage volume) or object storage (e.g., cloud provide storage bucket).

The uploading of additional file materials may be performed in a uniform manner, which does not vary between the underlying operating system and/or browser. The uploading of the additional file materials to a network-accessible storage may be fully transparent to the user. The network storage 344 may be provided in various modes (e.g., read-only, read-write, write-only), so the information is not required to be duplicated on each virtual browser cloud workspace, but may be used in a centralized manner. Such an approach may dramatically reduce a need for additional storage, and thereby minimize additional operational cost and time to copy and provide duplicated information.

In a successful operation of the above-described flow, the client browser may receive a successful response that includes an identifier for each of the uploaded files. If the file upload operation is successful, the client side of the application may append the files' identifiers to the information of the guided project within the browser's local storage. In case the above-mentioned flow fails in some way, the client may receive a corresponding error and additional message to describe the error. Once the author completes uploading of the learning materials, the author may select to proceed with the next step of bundling all of the information (mentioned above) for the guided project by clicking on a UI button with name, e.g., "Done". On button "Done" click, the client system sends a request to the project controller 130 to save the input data for the guided project in project store 330. The "Done" button also may initiate a request to the image configuration controller 128 to save any specifics or/and customizations of the cloud workspace template. In a successful operation, the project controller 130 and the image configuration controller 128 save the data and associate the data with unique identifiers, and assign ownership of the author for the guided project-related data using the unique identifiers. The unique identifiers may then be returned to the client/author side. In case of any malfunction or failures in the saving of guided project performed by project controller 130 or the image configuration controller 128, an error may be returned with specific code and additional details for which the UI generator 134 may generate a UI notification.

Creating and saving the virtual browser cloud workspace configuration typically does not include any OS/Browser level changes, and thereby dramatically reduce a time needed to save the whole configuration. In scenarios in which the virtual browser cloud workspace configuration does include any OS/Browser level changes, the underlying structure may nonetheless be layered, as shown in FIG. 3, so that only the impacted layers may be required to be saved, thereby save both storage capacity and time to save.

At this point, the author may request a virtual browser cloud workspace (e.g., the virtual browser cloud workspace 116) from the cloud workspace orchestrator 136 (426), e.g., to proceed with recording the instruction video. For example, the client side of the application may send a HTTP request to the server side component. Since the virtual browser cloud workspace runs on the container orchestrator 114, which, as described above, abstracts a pool of already allocated and provisioned computational, memory, and storage resources, the creation and provisioning of such a virtual browser cloud workspace may be performed in a fast and efficient manner. Any additional file materials previously provided may be automatically attached through a network-based driver in the configured mode to the virtual browser cloud workspace that will be provisioned and configured.

For example, the author/client side effectively sends a request to boot up a virtual browser cloud workspace to the cloud workspace orchestrator 136 for a specified guided project by sending the guided project's unique identifier. Upon providing of the unique identifier of the guided project, the cloud workspace orchestrator 136 may use the unique identifier to initiate a communication with the image configuration controller 128 to provide the guided project's image configuration from the image configuration store 332.

Thus, using the provided information, the cloud workspace orchestrator 136 may request a virtual browser cloud workspace container (which may also be referred to as a virtual browser container) from the container orchestrator 114 (428). For example, the container orchestrator 114 may be implemented using a Docker and Kubernetes-based architecture that is configured to generate virtual browser cloud workspaces as described with respect to FIG. 3, and return, for a particular virtual browser cloud workspace that is requested by an author, a corresponding unique identifier (ID) and related information for connection (e.g., network IP address, port and other network information) to the corresponding virtual browser cloud workspace.

The container orchestrator 114 may thus be provided with all necessary information to provision and configure the requested virtual browser cloud workspace and related resources (430). For example, the cloud workspace orchestrator 114 may instruct the container orchestrator 114 to perform the requested boot up of the virtual browser container from the specified container image using the specified configuration parameters. For example, the image configuration controller 128 may configure the image configuration store 332 and the container images store 334, previously-specified parameters for the network storage 344 may be utilized, the network traffic analyzer 138 may be configured, and the network traffic analysis store 360 may be provided.

The container orchestrator 114 may thus proceed with creating the virtual browser cloud workspace container (432). For example, the container orchestrator 114 may proceed with the requested boot process for the virtual browser cloud workspace container. In the Kubernetes example context, an init container may be used to specify each of the deployment parameters discussed above. The resulting deployment may thus include starting the virtual browser using the launch URL, restricting the browser using the DNS list obtained from the network traffic analysis store 360, attaching the network storage 344 and directory for the relate files, specifying and starting a remote access server/ application, and determining network access information for accessing the virtual browser cloud workspace container, such as a unique identifier (ID), a network address (e.g., IP address), and/or a network port on which the remote access server is running.

The container orchestrator 114 may then return a response to the cloud workspace orchestrator 136 that includes the above-referenced information (434). The cloud workspace orchestrator 136 may use the included information to wire network access, e.g., through a graphical remote access gateway 372 as referenced above and described below with respect to FIGS. 5 and 6, to the author's client side browser (436). The network access may be isolated for the author/user and virtual browser container so that no other entity may access the same connection without an explicit access request/approval.

Accordingly, the cloud workspace orchestrator 136 may send the generated identifier for the virtual browser cloud workspace container and remote access credentials to the author (438). The author may thus use the identifier and credentials to connect to the virtual browser via the graphical remote access gateway 372 and start recording a desired instructional video(s) (440).

Thus, in example implementations, the author receives an identifier for the connection that was created on the graphical remote access gateway 372 and required credentials (e.g., username and password), so the author may authenticate with, and connect to, the graphical remote access gateway 372. The graphical remote access gateway 372 may be configured to hide internal network details and connection details, while obtaining information from the remote access store 374 to connect to a remote access server/application's specific IP and port of the virtual browser cloud workspace container that was identified.

Then, the author, using the local browser, obtains access to the virtualized browser environment with an open web-based application, and with all of the previously-provided files attached via the network storage 344. The UI generator 134 may then generate a browser-based recorder for screen capture of the rendered virtual browser cloud workspace, while also capturing audio input from the local microphone. The author may also be provided with editing and other features to facilitate creation of the instruction video.

The instruction video may then be loaded and stored using the project store 330. This process may be repeated for multiple instruction videos, e.g., when each instruction video relates to a single or small set of tasks. By providing short content instruction videos, the learner may later be guided through the guided project in an iterative, gradual manner, so that it is easy to determine whether and when the learner struggles with specific content.

Figure 8:
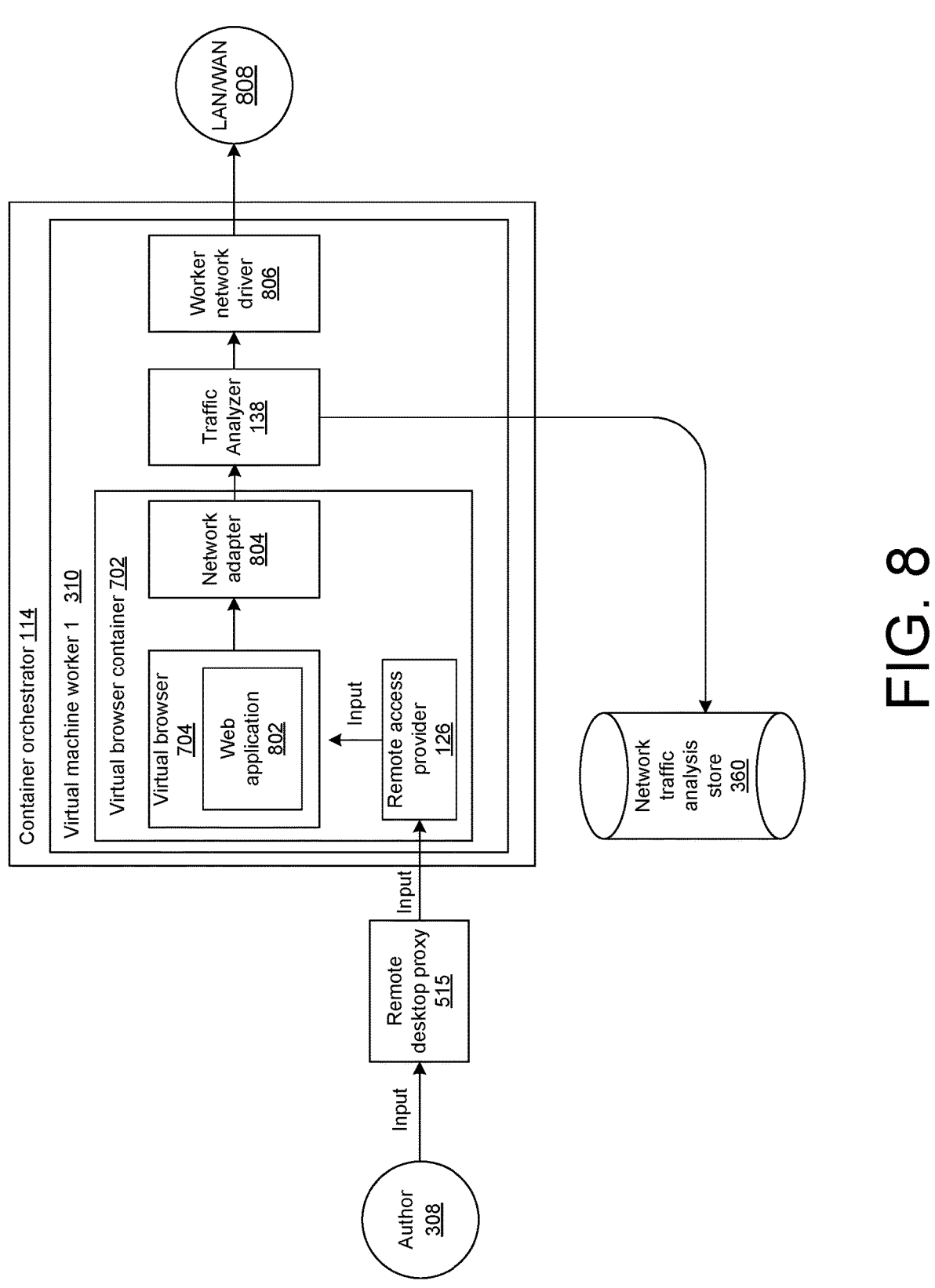
FIG. 8 is a block diagram illustrating an example implementation of network traffic analysis in the system of FIG. 3.
Figure 9:
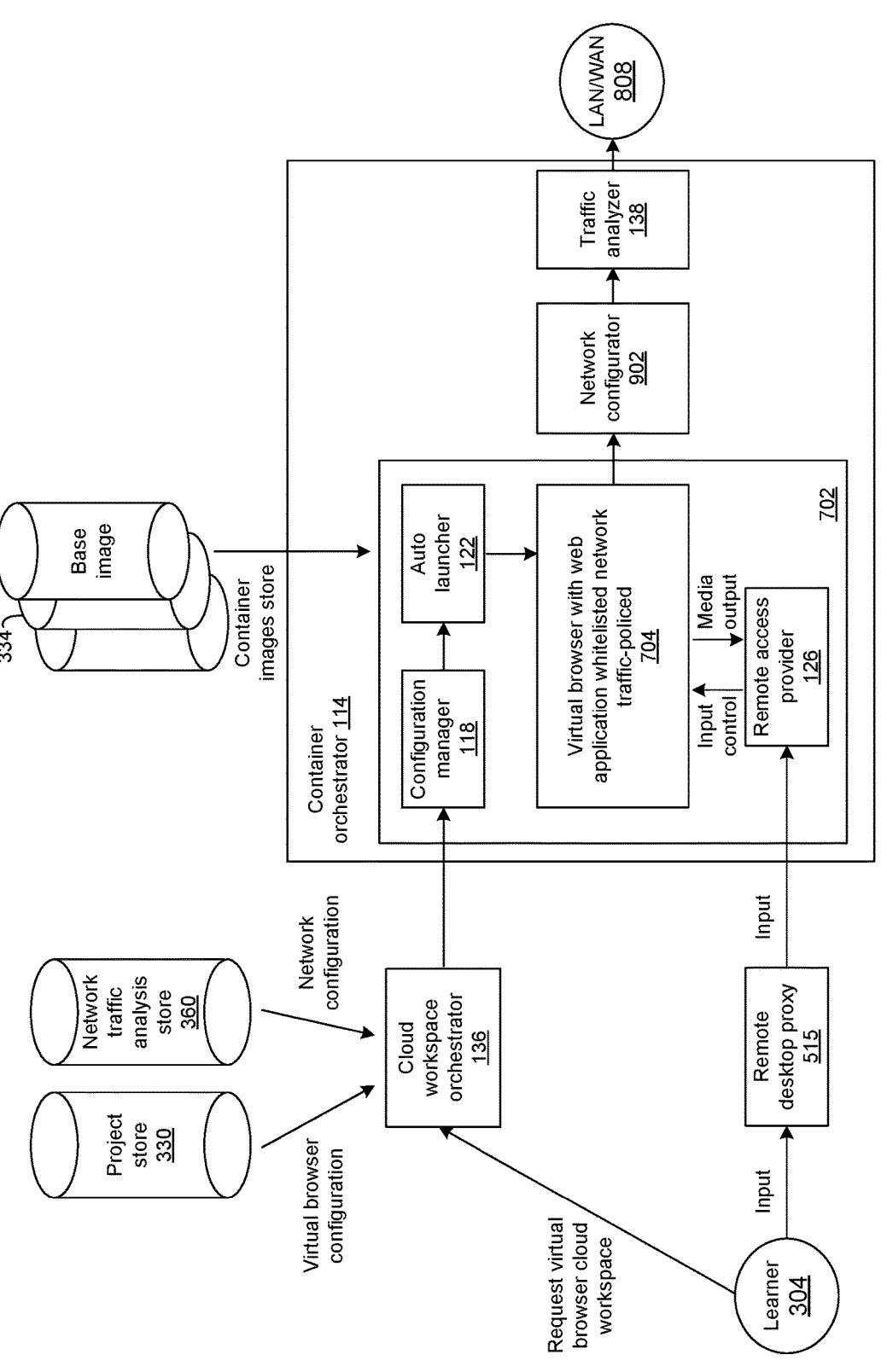
FIG. 9 is a block diagram illustrating an example implementation of network traffic control in the system of FIGS. 3 and 8.

During the recording phase, all network activity may be analyzed by the network traffic analyzer 138, and a list of called DNS domains may be collected automatically by the network traffic analyzer 138. The resulting list may be stored as part of the network traffic analysis store 360 and assigned to a specific identifier that corresponds to the guided project and/or guided project's container image identifiers. As described, this information may be used to restrict access for learners only to those internet domains that were requested during the authoring flow, as shown in FIG. 8 and FIG. 9. As described, this approach may improve security, resource usage, and learner experience(s).

Once the video materials are recorded and the processes of FIG. 4 otherwise completed, the resulting guided project may be packaged and published to a guided project catalog.

In this way, the resulting guided project may be easily located and experienced by various learners.

Figure 5:
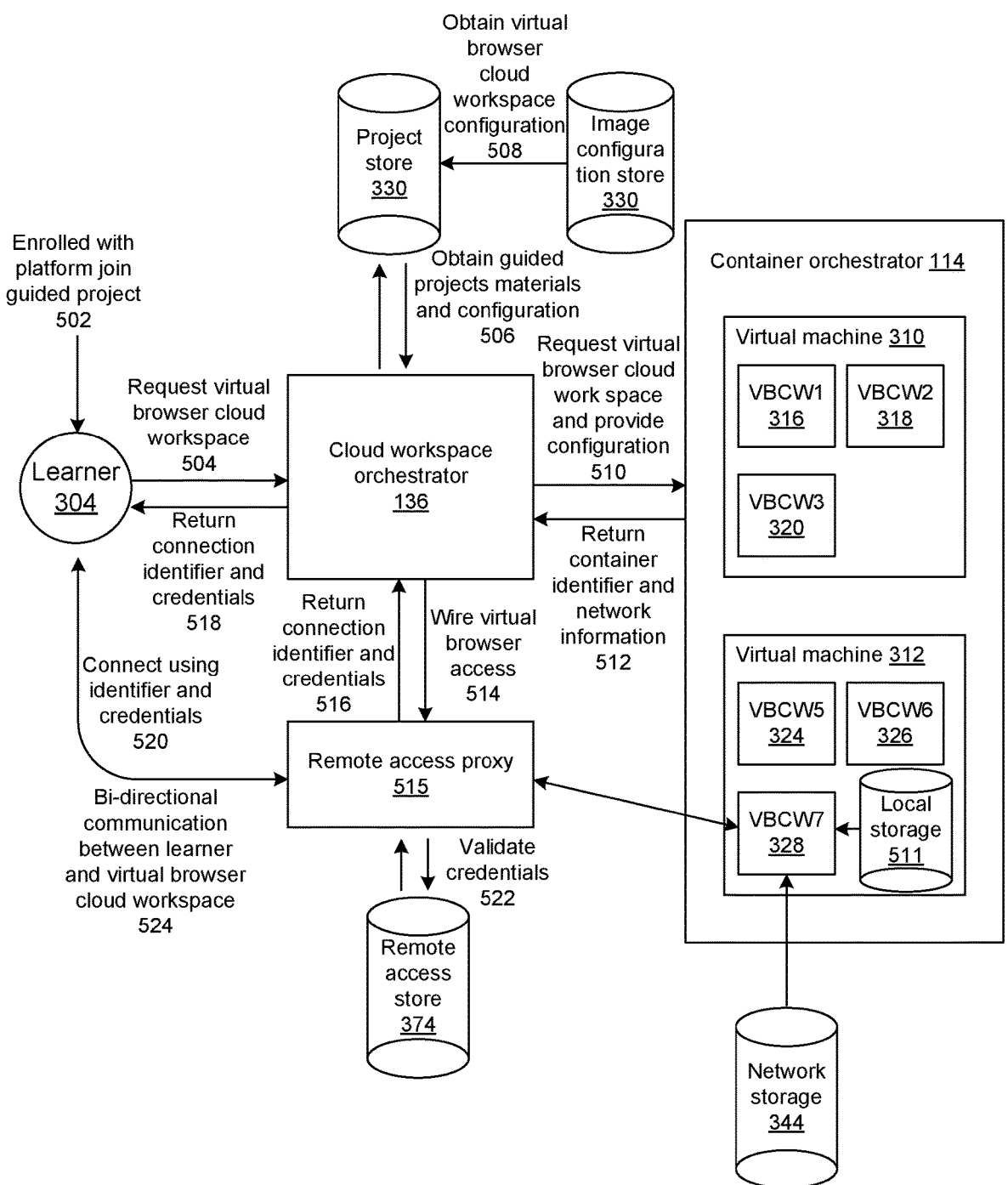
FIG. 5 is a block diagram of a more detailed example of the system of FIG. 3 when providing a guided project to a learner.

FIG. 5 is a block diagram of a more detailed example of the system of FIG. 3 when providing a guided project to a learner. As noted above, once a guided project is distributed using a guided project catalog or as part of any other learning product, the learner may enroll and experience it (502).

For example, the learner 304 may, from within the browser 302 of FIG. 3 (or the browser 106 of FIG. 1), select the guided project to experience, and thereby initiate a request for a virtual browser cloud workspace (504), which, as shown, is provided to the cloud workspace orchestrator 136.

The cloud workspace orchestrator 136 obtains the guided project materials from the project store 330, including the relevant launch URL, instruction video(s), and instruction file(s), if any, (506). As shown and described, the project store 330 may access or obtain virtual browser cloud workspace configuration data from the image configuration store 332 (508). The cloud workspace orchestrator 136 then requests a virtual browser cloud workspace from the container orchestrator 114, in conjunction with providing the obtained configuration data (510).

Figure 6:
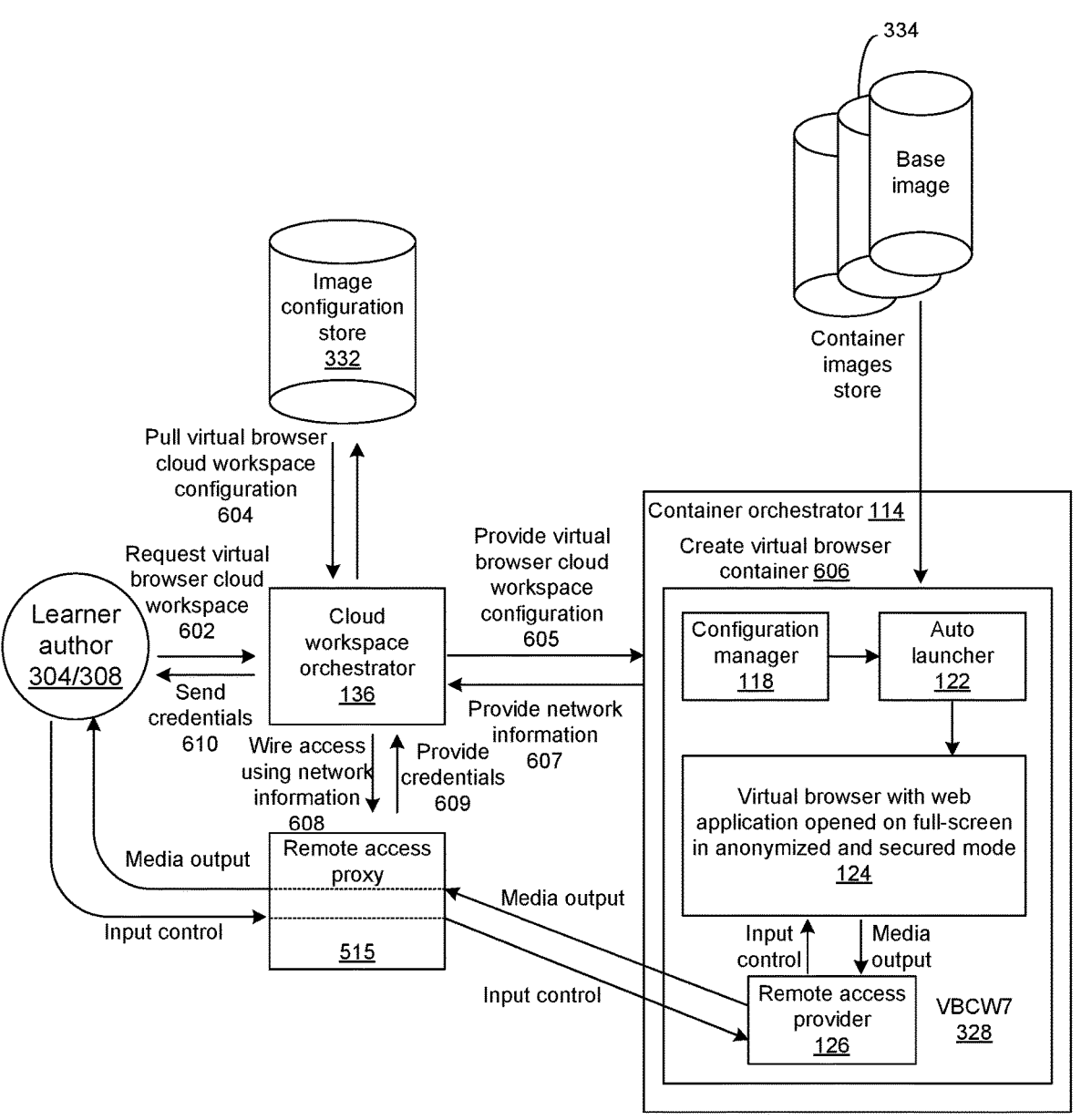
FIG. 6 is a block diagram illustrating an example of instantiating a virtual browser cloud workspace and conducting interactions between the virtual browser cloud workspace and a learner or author.

The container orchestrator 114 creates the virtual browser cloud workspace container, e.g., the VBCW7 328 in FIG. 5, and, as described herein, e.g., above with respect to FIG. 4, uses a base image from the container images store 334 (as shown in FIG. 3 and FIG. 6), and supplies the launch URL for the web application that needs to be opened to the configuration manager 118 within the virtual browser cloud workspace container 328 (as also shown in FIG. 1). The configuration manager 118 may then use the provided launch URL and invoke the auto-launcher 120 of FIG. 1 to boot up the virtual browser 122 with the specific launch URL.

The virtual browser 122 may be configured in an anonymized and secured mode. The virtual browser 122 may be configured to automatically open the pre-configured launch URL in a full-screen mode. In addition, the container orchestrator 114 may be configured to automatically mount the pre-configured network-accessible files from the network storage 344 (and/or from local storage 511) to the virtual browser cloud workspace container 328. Once the status of the container is available the container orchestrator returns a response to the cloud workspace orchestrator 136 (512), including a unique container identifier for the virtual browser cloud workspace container 328 and related network access information.

The cloud workspace orchestrator 136 may then wire access for the learner, based on the information from the container orchestrator 114 (514), and using a remote access proxy 515 (as an example implementation of the graphical remote access gateway 372 of FIG. 3), which store the credentials in the remote access store 374. That is, the cloud workspace orchestrator 136 may prepare the remote access proxy 515 to establish a connection between the virtual browser cloud workspace (VBCW7 328) and the learner 304. After receiving the appropriate connection identifier and credentials from the remote access proxy 515 (516), the cloud workspace orchestrator 136 may forward the connection identifier and credentials from the remote access proxy 515 to the learner (518). The learner 304 may then use the credentials to connect to the virtual browser cloud workspace 328 via the remote access proxy 515 (520). The remote access proxy 515 then validates the previously-stored credentials using the remote access store 374 (522), thereby enabling bi-directional communication between the learner 304 and the virtual browser cloud workspace (524).

As a result, the learner may experience the same hands-on virtual browser cloud workspace environment as created by the author, during the authoring of the guided project. The learner may use all the provided learning materials (video recordings, additional files materials and the virtual browser container environment) to learn and practice the given topic in a guided but hands-on manner.

Based on the guided project content length and various other factors, the cloud workspace orchestrator 136 may calculate an estimated time for learners to access a virtual browser container. The time may be computed dynamically, e.g., using various factors and heuristics, to make sure the learners have enough time to finish the guided project.

FIG. 6 is a block diagram illustrating an example of instantiating a virtual browser cloud workspace and conducting interactions between the virtual browser cloud workspace and a learner or author, using remote access proxy 515. Most remote access protocols are not suited to be used in a web environment, e.g., because they are not supported in web browsers. Accordingly, the remote access proxy 515 may be configured to transform a remote access protocol from a virtual browser instance to a remote access protocol that works in an end user web browser (e.g., the browser 302 of FIG. 3, or the browser 106 of FIG. 1).

Additional examples of the actual communication may include receiving a request from the learner or author for a virtual browser cloud workspace (602). As already referenced, the cloud workspace orchestrator 136 may obtain required information from the image configuration store 332 (604) (as well as other guided project information, if needed, as already described with respect to FIG. 5). The cloud workspace orchestrator 136 may then send instructions to the container orchestrator 114 to create a virtual browser cloud workspace container using the obtained configuration (605).

The container orchestrator may then create the virtual browser cloud workspace environment 328 and expose network available IP and port address(es) through which the virtual browser cloud workspace environment is accessible (606). The container orchestrator 114 may then send the network information to the cloud workspace orchestrator 136 (607).

The cloud workspace orchestrator 136 may then communicate with the remote access proxy 515 to wire or otherwise prepare author/learner access to the virtual browser cloud workspace 328, using the network information (608). The remote access proxy 515 may store the network information and return credentials (609).

The identifier of the virtual browser cloud workspace 328 and credentials may then be sent to the learner/author (610). The credentials may then be used to connect to the virtual browser cloud workspace 328 via the remote access proxy 515, as shown. That is, the learner/author is provided with input control of the virtual browser cloud workspace 328, and media output of the virtual browser cloud workspace 328 is provided to the learner/author 304/308.

Figure 7:
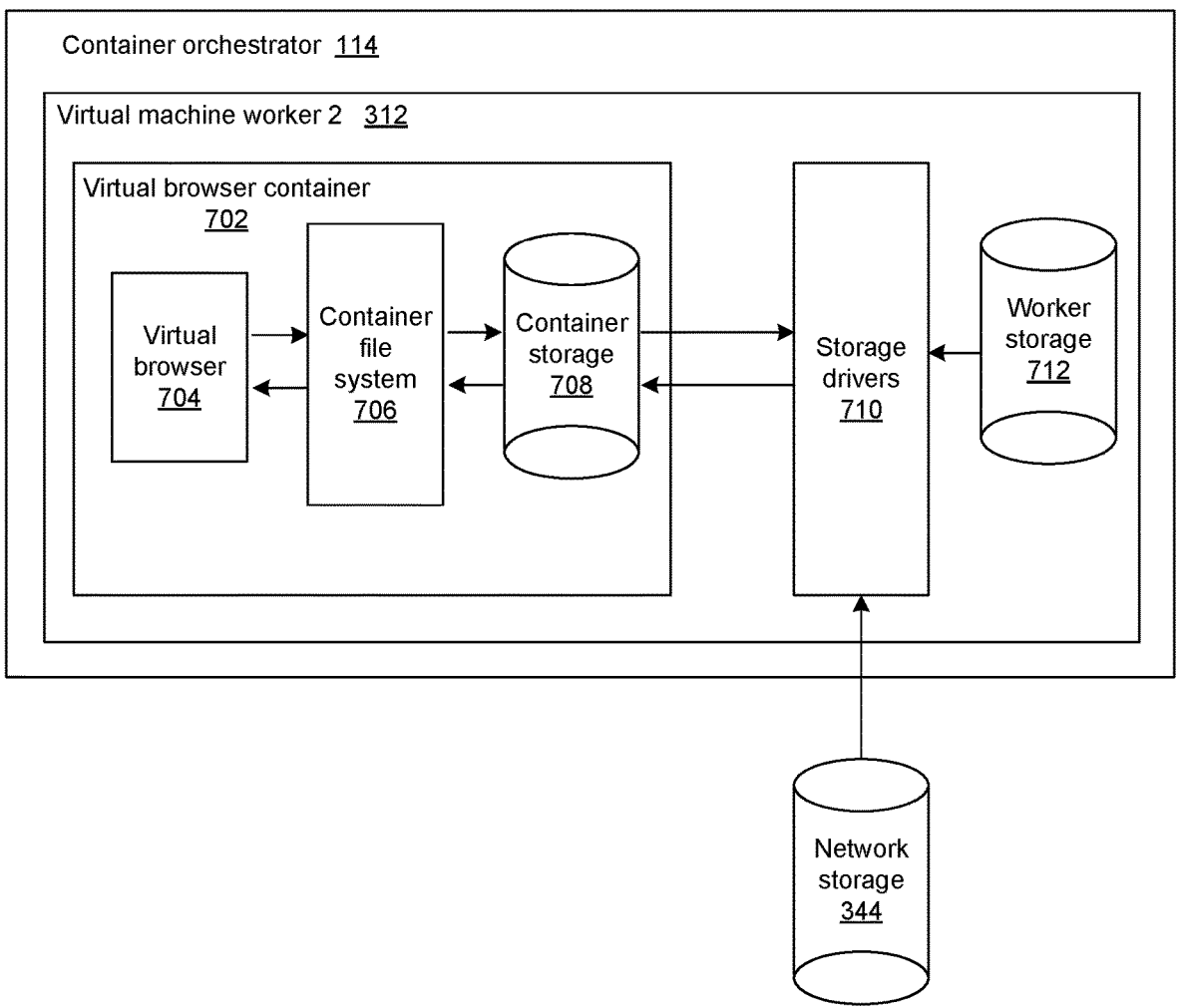
FIG. 7 is a block diagram illustrating example techniques for providing file storage and access in the system of FIG. 3.

FIG. 7 is a block diagram illustrating example techniques for providing file storage and access in the system of FIG. 3. As described above, the virtual browser cloud workspace 116 of FIG. 1 may support various on-host and network-accessible storages due to the abstraction of the underlying container orchestrator 114. Such storages may include, e.g., various implementations of local and network object storages, block device storages, or Network File Systems. The learning materials may be distributed to multiple storages at the same time to provide robust redundancy in the event of any local or remote failures, in order to prevent disruptions on the learner side during the virtual browser guided project experience.

In more detail, in the example of FIG. 7, an example virtual browser container 702 is illustrated as including a virtual browser 704 having access to a container file system 706. Consequently, as described above, a user may use the virtual browser 704 to access the container file system 706 and thereby obtain or access files from container storage 708.

As further illustrated, the container storage 708 may utilize one or more storage drivers 710 to access worker storage 712. That is, the worker storage 712 represents memory of the virtual machine worker 312 on which the virtual browser container 702 is deployed. In addition, the storage drivers 710 may access the network storage 344 that is provided outside of, but accessible by, the virtual machine worker 312.

Consequently, in addition to the above features and advantages related to redundancy and reliability, the implementation of FIG. 7 provides multiple options for providing learning materials during completion of virtual-browser based guided projects. For example, a read-only folder with files may be attached to a virtual browser instance. For this to be accomplished, the desired files may be attached to the guided project, and the desired folder(s) may be attached to the virtual browser instance (e.g., the virtual browser 704).

In more detail, for virtual browser based guided projects, there may be no need for customization of the browser, and a step for uploading files may be added. In such a file upload step, the author may upload files, which are sent to the learner after the completion of course. Those files may be the same or similar to files that the learner uses on the virtual browser cloud workspace during the completion of the project, in which case it may be confusing for the learner to have two components that are so similar. Instead, a single component may be used, and the author can select files to be sent to the learner after completion of the guided project.

A suitable UI may be represented as a list of files, so that an author may upload files one by one, delete them from the list, and/or select files to be sent on completion of the guided project. In some implementations, it is possible to have a global checkbox saying "send all files to learner", instead of choosing each file separately. Since those files should be available to the author during recording of the instruction video, it is possible to add a file upload step before the task recording step.

For user experience it is possible to support transactional and versioning, which means, for example, that on updating a guided project, no changes to files should be applied until author clicks"save". Then, all file changes the author made may be applied only to the newly created instance of the virtual browser.

In more detail, during the file upload process (during the authoring phase of the guided project), rather than directly attaching the file (Unified Resource Identifier) URIs to the guided project entity in project store 330 (shown in FIG. 3), it is possible to create a separate entity collection, e.g., database table (e.g. files) to store the file URIs with relevant meta information (e.g. ID, name, mime type, URI or/and file size). In other examples, it is also possible to create another entity collection, e.g., a database table (e.g. course_files) that will associate the guided project unique identifier (e.g. course_id, course_version_id) with the file unique identifier (e.g., file_id) in a many-to-many relationship thus connecting the uploaded files to the guided project together.

With the above-described structure and approach, a file upload process may be implemented using the following steps. The author of a guided project may choose some file(s) from their user device using their local browser 302. After choosing the file(s) the author/client side 308 (shown in FIG. 3) may ask a server-side component project controller 130 (e.g., shown in FIG. 3) for a file upload token providing metadata of the files (e.g., filename, size, mime type). The project controller 130 may issue a unique secured and signed token that corresponds to the given files' meta information and return it back to the author/client 308 of the system. The author/client 308 may use the issued token to authenticate and validate the upload to a cloud provider or on-premise hosted network storage (e.g. storage bucket, network file system). After the upload operation is completed the cloud provider or/and on-premise hosted network storage may generate a unique resource identifier (URI) for each of the uploaded files. The author/client 308 may send an HTTP request to the project controller 130 (shown in FIG. 3) to write the file(s) metadata including the provided URI in the project store 330. The project controller 130 may write an entity record for each of the provided files and return a unique identifier. In the end, the author/client 308 may send an HTTP request to the project controller 130 (shown in FIG. 3) to associate the file(s) to the virtual browser guided project. The above atomic operations may be implemented separately or in any meaningful combinations to speed the project and ease the authoring experience for uploading learning materials to a guided project.

The above-described example structure may enable easy maintenance of files, provide versioning, and enable transactional exchanges with all files reliably stored on s3. The described approach is thus reliable and easy scalable, does not require major frontend changes, and provides flexibility with respect to how files are attached to a virtual browser.

With respect to attaching the learning materials to a virtual browser container 702, multiple attaching options may be available. For example, an attaching of learning materials to a virtual browser cloud workspace in the context of a Kubernetes container orchestrator an init container may be used. The cloud workspace orchestrator 136 may provide the file(s) URIs needed to be provisioned to the virtual browser cloud workspace during creation. Then a specialized Docker container may be used to download the files on the container storage 708 using standard internet protocols, such as HTTP. The Docker container may then download the files and store them on the container file system 706. Then the Kubernetes container orchestrator may proceed with the booting process of the virtual browser 704 and all other software tooling needed to facilitate the virtual browser initialization and utilization from both author and learner perspectives. However, having files downloaded from remote network storage at each start of a new virtual browser container 702 may consume network traffic (e.g., in topics like data analysis, machine learning, and artificial intelligence) and may increase the start-up time of the virtual browser container 702.

Another example for implementing an attachment of learning materials to a virtual browser container 702 may include usage of Network File System (NFS) (e.g. AWS Elastic File System (EFS), and/or Samba shared Linux file system, NFS) to directly attach the files without the need for an initial download and hardcopy of the files. If the files are stored on a network storage bucket (e.g. AWS S3 bucket), then the system may synchronize the desired files between the AWS S3 bucket and the AWS EFS by creating a separate directory on the AWS EFS and transferring the file using standard internet/network protocols for file exchange like HTTP, SFTP. Once the desired learning materials are downloaded, the system may provide a remote network directory attachment from the EFS to the virtual browser container 702 using the storage driver 710. Depending on the implementation the attachment may be provided in read-only (RO) or read-write (RW) mode. Depending on the use case this example implementation may provide dramatic speed improvement over the booting process of the virtual browser container 702 and the learning materials provisioning as well as reduce the network traffic and virtual machine 2 314 worker storage 712 operational costs.

With respect to the synchronization of learning materials between an AWS S3 bucket and an AWS EFS file system, in the example explained above, some implementations may be performed as part of bundling the guided project and publishing the guided project into a project store 330 in FIG. 3. This type of solution may be less likely to increase start-up time. However, it may be necessary to wait until files are copied from AWS S3 to AWS EFS, in which case the author/client side may be notified, and it may be difficult to provide the learner with an instance until the synchronization is complete (otherwise files may not be available). Another implementation may be to provide the implementation with the initial download until the synchronization between AWS S3 and AWS EFS is completed and the switch to using AWS EFS attachments for new virtual browser containers is made.

FIG. 8 is a block diagram illustrating an example implementation of network traffic analysis in the system of FIG. 3, during an authoring process. In the example of FIG. 8, the author 308 authors a guided project using the virtual browser container 702 hosted on the virtual machine worker 310 that is a part of a container orchestrator 114. In this example, the author 308 may use a web application 802 using the virtual browser 704, and control the web application 802 through input and output feedback via the remote desktop proxy 515. During the recording of video instructions, the author may interact with the web application and/or use multiple web applications to record the instructions. Each access to a web application through the virtual browser 704 to the LAN/WAN 808 generates network traffic to a specific set of DNS domains that are translated to network IP addresses. The network traffic from and to the virtual browser 704 goes through the virtual browser container's network adapter 804. The network is then redirected to the virtual machine worker 310 worker network driver 806 before it goes to the LAN/WAN 808. In example implementations, traffic analysis may include plugging a network traffic analyzer 138 that may intercept the network traffic going in and/or out to and/or from the virtual browser to record the network activity. The network traffic analyzer 138 may record parts of the network traffic (e.g. DNS domain names, IP addresses, ports) and may generate a list of such domain names and store them in a network traffic analysis store 360. Each of these domain name entries may be associated with a unique identifier (ID) as well as an identifier connecting them to the guided project that is being recorded during the illustrated flow.

In a more detailed example, the interception of the network traffic using the network traffic analyzer 138 may be implemented in the context of a Kubernetes container orchestrator as a sidecar container that runs a customized version of a DNS recursive server. In such implementations, each of the resolving requests for a DNS domain name to be translated to specific IP, may go through that customized version of a DNS recursive server. The DNS recursive server does not resolve DNS domain names to IP addresses directly, but is configured to forward the requests to a chain of broader DNS servers until the requests hit an authoritative DNS domain server that knows the domain to IP address translation. The customized DNS server that acts like a traffic analyzer 138 may collect the DNS requests from the virtual browser 704 during the usage of a web application 802. Each of the collected DNS requests can be analyzed and the DNS domain name may be extracted and recorded in a entity storage (e.g. database or object store). Each of the recorded DNS domain entity may include, but is not limited to including, a unique identifier, the DNS domain Fully Qualified Domain Name (FQDN), and/or the guided project unique identifier as a reference. These records may be later used to traffic shape the learner experience by limiting the network access of the learners' virtual browser cloud workspace to a set or subset of domains associated with the guided project. The process explained above in words (and visually in FIG. 8) thus illustrates collecting network information during the authoring phase of a guided project and generating a whitelist of possible DNS domain names for traffic shaping the learner experience of a guided project on virtual browser cloud workspace.

FIG. 9 is a block diagram illustrating an example implementation of network traffic control in the system of FIGS. 3 and 8, from the learner perspective. FIG. 9 illustrates use of the traffic analyzer 138 in the context of the above-described processes for instantiating the virtual browser container 702, where such processes are not repeated here in detail, except as needed to facilitate understanding of the operations of the traffic analyzer 138 and related functions and features.

FIG. 9 is a block diagram illustrating a learner experience on a virtual browser cloud workspace with traffic shaping allowing network traffic to only whitelisted DNS domains gathered during the authoring process shown as an example in FIG. 8. The example process may include a learner 304 accessing a virtual browser container 702 through a remote desktop proxy 515 that is created and provisioned for the learner 304 through the cloud workspace orchestrator 136 using the project store 330, container image store 334 and the container orchestrator 114. During the creation of the virtual browser container 702, the cloud workspace orchestrator 136 may instruct the configuration manager 118 to restrict the virtual browser 704 through a network configurator 902 or/and traffic analyzer 138 to allow network access to a predefined list of DNS domain names obtained from the network traffic analysis store 360. In more detail, an example of network configurator 902 could be provided by a modern browser (e.g. Chromium, Google Chrome or Firefox) directly as a browser setting that allows a configuration of a whitelisted DNS domains 362 (shown in FIG. 3). In such examples, the configuration manager 118 may instruct the browser to allow network traffic to the whitelisted DNS domain names during the browser start-up process as a command-line setting, change in configuration file of the browser, or as an environment variable setting. In other examples the implementation may include a customized recursive DNS server (used in the example implementation of gathering DNS domain names during authoring, as described above with respect to FIG. 8). The customized recursive DNS server may be configured to forward the resolving of DNS domains to authoritative servers only if the domain is present in the whitelisted DNS domain names provided by the configuration manager 118. If the requested DNS domain name is not in the list with whitelisted DNS domain names an error may be returned which may result in corresponding error webpage rendered in the learner's virtual browser 704. These example implementation may be used separately or in conjunction with one another.

Figure 10:
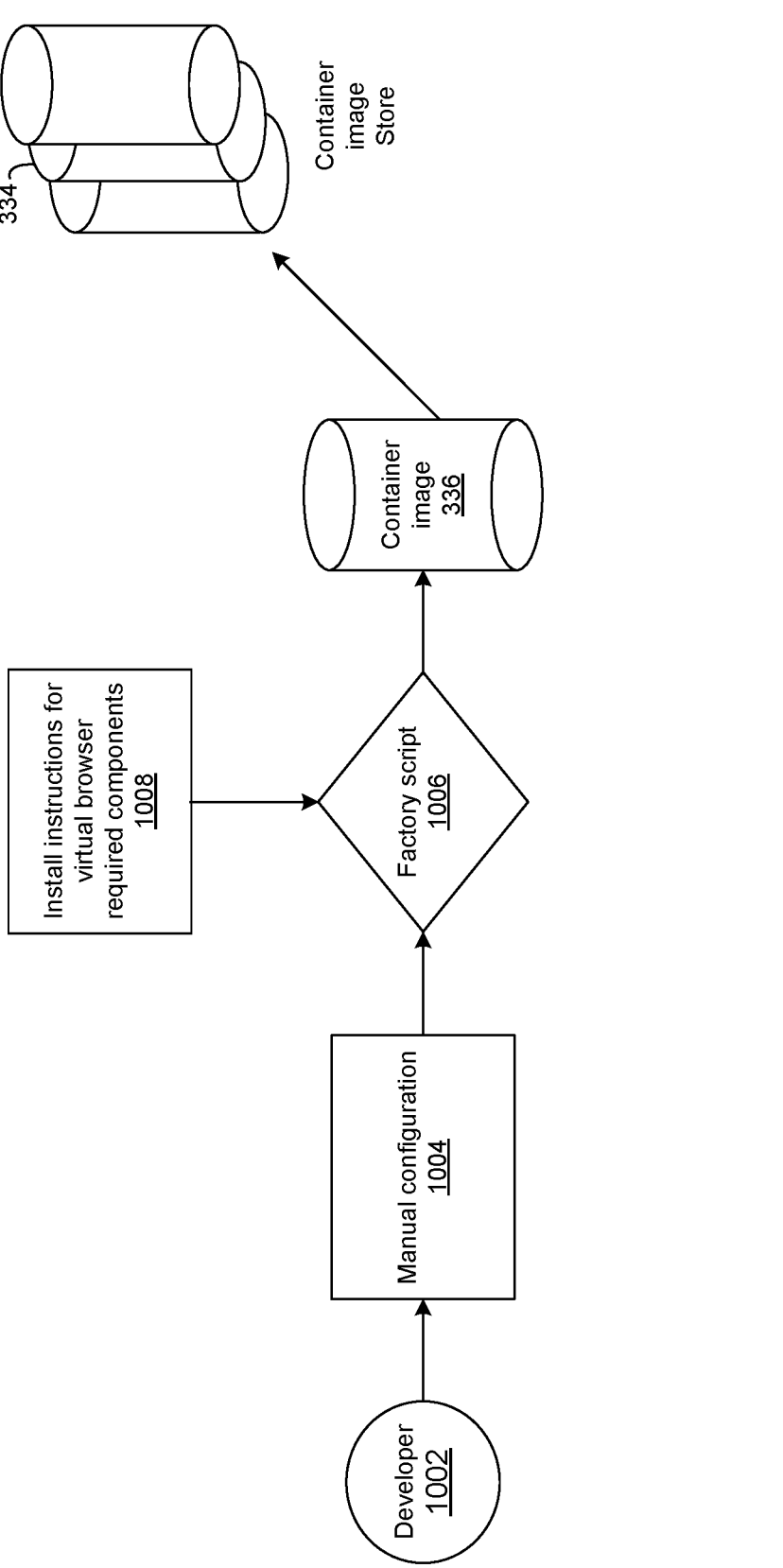
FIG. 10 is a block diagram illustrating a virtual browser cloud workspace configuration creation.

FIG. 10 is a block diagram illustrating a setup of a virtual browser cloud workspace configuration/template that will used for booting the virtual browser cloud workspace/containers during authoring and learner experience flow(s) already explained above. The process starts with a developer 1002 providing manual configuration 1004, which, with automated install instructions 1008, allows a factory script 1006 to create a base template (i.e., cloud workspace configuration) as a layered container image 336 for the virtual browser cloud workspace type, for storage in the network accessible container image store (e.g., registry) 334.

A link and credentials to the container image 336 may be seeded to the cloud workspace orchestrator 136. Once the base template is seeded to the cloud workspace orchestrator 136, the platform may being utilizing the virtual browser cloud workspace type.

In some example implementations, all virtual browser instances are launched from the same base template. But the system is not limited, and may support various virtual browser base images, which may can vary in configuration.

Virtual browser cloud workspace configurations may include, e.g., a web browser for accessing the web application during the authoring and learning experience. Virtual browser cloud workspace configurations may include the configuration manager 118 that seeds the pre-defined launch URL for the web application that will be used during guided project authoring, as well as later during the learning experience. Virtual browser cloud workspace configurations may also include the auto-launcher 120 for the virtual browser 704/124, as well as remote access protocol software or other implementation of the remote access provider 126 that captures the browser screen and provides interactive control to the browser screen over the network.

Although many specific examples are provided above, it will be appreciate that many additional or alternative implementations and optimizations may be included. For example, to speed up the booting process of underlying virtual machine workers of the container orchestrator 114, the cloud workspace orchestrator 136 may use various heuristics and data to provide enough provisioned computing, memory and storage, so that the virtual browser cloud workspace creation and provisioning are fast and convenient for the purpose of authoring and learner experiences. The process may include over-provisioning the virtual machine workers with some placeholder containers that essentially reserve computation, memory and storage resources, but do(es) not execute any computation, storage or memory operations and loading. The container orchestrator may run containers with different priority to ensure containers with higher priority get more compute, memory and storage resources. In such cases, the placeholder containers may be run in the lowest possible priority. When a new virtual browser container is about to be created and the virtual machine worker does not have unallocated compute, memory and/or storage, one of the placeholder containers may be shut down and the virtual browser container may take its resources. In addition to over provisioning individual virtual machine workers, the container orchestrator may track the allocation of resources across the whole cluster and add or remove new virtual machine workers to sustain or reduce the load based on the overall platform requirements and load. Accordingly, the cloud workspace orchestrator may compute how many placeholder containers need to be deployed in any given time so that the platform has enough hardware resources to launch virtual browser containers, while the container orchestrator adds or removes new virtual machines workers depending on the overall computation, memory and storage load that is currently executing. The platform may thus ensure that amortized time for creating and provisioning virtual browser cloud workspace cost a fraction of the time for creating and fully provisioning a virtual machine cloud workspace.

Thus, the above description provides and describes an internet browser-based, hands-on learning experience, using lightweight virtualized browser environments hosted in an on-premise or cloud provider for providing a side-by-side learning experience with interactive cloud workspace and video learning materials. The system includes both authoring and learning experiences.

In addition to the authoring process as described above, the learner experience allows learners to experience side-by-side learning with a lightweight interactive virtualized browser environment (virtual browser cloud workspace) while watching instructional videos on the same screen without the need to swap between local browser tabs. The learning materials (digital files) prepared during the customization of the virtual browser cloud workspace in the authoring experience may be auto-provisioned and the learners can use them without the need to upload/download anything. The learners are limited to access only specific domains that are obtained dynamically during the authoring of the instructional videos.

Running virtual browser cloud workspace environments streamlines the process of authoring digital online learning content and provides an interactive environment for web-based applications and services by utilizing on-premise or/and cloud providers for automation and provisioning lightweight virtualized environments at scale. The use of such virtual browser cloud workspace environments minimizes friction and distraction, decreases authoring time, optimizes operational cost and provides a uniform way of authoring and learning. Consequently, the virtual browser cloud workspace type dramatically improves and simplifies both the author and learner experiences.

Put another way, the presented systems and techniques enable a side-by-side hands-on learning experience system for the purpose of web-based application education. The system(s) on one side provides a quick and consistent way of setting up a virtualized browser environment, authoring (recording, editing and packaging) of video instructions content, providing learning materials and packaging all included materials in an interactive, hands-on experience.

Described techniques provide a way to automate, provision and distribute the packaged hands-on learning experience to learners in a consistent, easy-to use and mass scale manner. Each of the learner's virtualized browser environments receives the exact setup the author provided during the authoring phase, including a browser with a specific version and configuration, an auto-launching of the desired web-based application. The learning materials may be auto-attached to the virtualized browser environment, and the learner may receive a graphical remote access to the virtualized browser environment.

The described virtual browser cloud workspace environment provides fast and simple access to a virtualized browser environment and graphical remote network access, to streamline and simplify the hands-on learning process in a side-by-side digital learning environment for web-based applications. Such an approach is significantly superior to using multiple, unrelated, unsynchronized browser tabs/windows to interact with instructional material and relevant web application(s). As described, described techniques are more convenient, easier to use, and ensure that learners are using a correct browser and other configuration details, while restricting the learners to correct domains.

In addition, described techniques enable automatic attachment of additional learning materials to the virtual browser container, so that the learner may locate, import, and otherwise use such learning materials in an straightforward manner. Such an approach is superior to requiring the learner to locate relevant learning materials, or to requiring the author to separately provide the learning materials. Such an approach avoids scenarios in which the learner has access to learning materials that are guaranteed to be relevant and accurate (e.g., recorded using the same OS or other platform details).

Further, such learning materials may be provided in a fast, convenient, reliable manner, even if the relevant files are extremely large. In such scenarios, in conventional systems, the learner may not have sufficient local storage for such large files, or may be inconvenienced by their download, copy, and/or storage (e.g., may experience delays and/or incur additional costs). In contrast, in described techniques, a single read-only file may be shared by many different users.

Thus, the described virtual browser cloud workspace provides a fast and consistent way for authors of hands-on learning education materials to prepare custom configurations, install learning materials, and automate the replication and provisioning of the same setup, along with automated wiring of graphical remote network access to thousands/millions of learners. Since the virtual browser cloud workspace is a lightweight containerized environment, the boot-up process is fast and reliable.

Using the virtual browser cloud workspace dramatically simplifies the customization process by providing a pre-installed browser environment, so the author only needs to provide the launch URL and the learning materials as files. Then, during learning, the virtual browser cloud workspace will automatically launch the browser and populate the launch URL to access the web-based application. The learning materials will be auto-attached to the container so the author/learner can access them in a unified manner.

Running such a system at scale would need to provide security and prevention of malicious activities that the learners may do on the behalf of the company that provides the learning service or on the behalf of the on-premise or cloud provider that hosts the cloud infrastructure. To prevent this, the described techniques dynamically collect a set of whitelisted internet domains during the authoring portion of the content creation process and then limits the learner's access to the public internet, e.g., using traffic shaping, based on the dynamically created set of internet domains.

Use of pre-configured cloud workspace environments allows replicating the setup provided in the instructional material in a consistent manner, removing any discrepancies or differences that may occur in manual setup by the learners of the provided software toolchain, which may otherwise incur obstacles and friction in following the instructions and create difficulties and insufficiency in the hands-on online learning process. Such a preconfigured cloud workspace environment further allows a consistent and deterministic approach for modifying and/or upgrading cloud workspace setup in case of software modifications or/and upgrade needs, because of, but not limited to, software security exposure patches, new software features available, changes in instructional materials, extending the instructional material, modifying or/and extending working data (such as images in case of image processing, videos provided in case of video editing educational content, or datasets provided in case of machine learning and AI educational content)

The preconfigured cloud workspace environment allows sharing and/or reusing of existing setups in multiple hands-on learning products, such as, e.g., sandbox environments (e.g., an interactive cloud workspace without instructional materials for experimentation purposes, practical projects (e.g., guided projects), or embedded in existing learning products such as, e.g., courses, specializations, and bachelor or master degrees as complimentary interactive environments in which learners may experiment and solidify their practical skills and obtained knowledge.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:

receive, from a client device hosting a browser, a request for a guided project teaching usage of a network-accessible resource, the guided project including an instruction video explaining the usage of the network-accessible resource;

provide, in response to the request, a virtual browser cloud workspace running on a containerized computation environment hosting a virtual browser and remote access software;

provide, at the browser of the client device, an interactive learning environment that includes a virtual browser interactive window and an instructional window;

provide the instruction video within the instructional window;

provide, using the remote access software, bidirectional communication between the virtual browser interactive window and the virtual browser while the virtual browser is accessing the network-accessible resource; and control the network-accessible resource at the virtual browser interactive window to enable completion of the guided project in conjunction with the instruction video.

2. The computer program product of claim 1, wherein the virtual browser cloud workspace is provided using a container orchestrator configured to deploy multiple virtual browser cloud workspaces, including the virtual browser cloud workspace, using a shared virtual machine.

3. The computer program product of claim 1, wherein the instructions, when executed by the at least one computing device, are further configured to cause the at least one computing device to auto-launch the network-accessible resource within the virtual browser in conjunction with providing the virtual browser interactive window.

4. The computer program product of claim 1, wherein the network-accessible resource includes a web-based application.

5. The computer program product of claim 1, wherein the instructions, when executed by the at least one computing device, are further configured to cause the at least one computing device to:

provide the virtual browser cloud workspace with a container file system and container storage for accessing at least one file stored in conjunction with the guided project, using the virtual browser.

6. The computer program product of claim 1, wherein the instructions, when executed by the at least one computing device, are further configured to cause the at least one computing device to:

execute the bidirectional communication using a remote access proxy accessed by both the browser of the client device and the virtual browser cloud workspace.

7. The computer program product of claim 6, wherein the instructions, when executed by the at least one computing device, are further configured to cause the at least one computing device to:

store authentication credentials for the remote access proxy;

provide the authentication credentials to the browser of the client device;

receive the authentication credentials from the browser of the client device for authenticating against the stored authentication credentials; and provide the virtual browser interactive window in response to the authenticating against the stored authentication credentials.

8. The computer program product of claim 1, wherein the instructions, when executed by the at least one computing device, are further configured to cause the at least one computing device to:

monitor network traffic during a recording of the instruction video; and store whitelisted domains of the network traffic that are related to the network-accessible resource.

9. The computer program product of claim 8, wherein the instructions, when executed by the at least one computing device, are further configured to cause the at least one computing device to:

monitor the bidirectional communication; and restrict use of the virtual browser to access the whitelisted domains.

10. A computer-implemented method comprising:

receiving, from a client device hosting a browser, a request for a guided project teaching usage of a network-accessible resource, the guided project including an instruction video explaining the usage of the network-accessible resource;

providing, in response to the request, a virtual browser cloud workspace running on a containerized computation environment hosting a virtual browser and remote access software;

providing, at the browser of the client device, an interactive learning environment that includes a virtual browser interactive window and an instructional window;

providing the instruction video within the instructional window;

providing, using the remote access software, bidirectional communication between the virtual browser interactive window and the virtual browser while the virtual browser is accessing the network-accessible resource, to thereby provide control of; and controlling the network-accessible resource at the virtual browser interactive window to enable completion of the guided project in conjunction with the instruction video.

11. The method of claim 10, wherein the virtual browser cloud workspace is provided using a container orchestrator configured to deploy multiple virtual browser cloud workspaces, including the virtual browser cloud workspace, using a shared virtual machine.

12. The method of claim 10, further comprising:

auto-launching the network-accessible resource within the virtual browser in conjunction with providing the virtual browser interactive window.

13. The method of claim 10, wherein the network-accessible resource includes a web-based application.

14. The method of claim 10, further comprising:

providing the virtual browser cloud workspace with a container file system and container storage for accessing at least one file stored in conjunction with the guided project, using the virtual browser.

15. The method of claim 10, further comprising:

executing the bidirectional communication using a remote access proxy accessed by both the browser of the client device and the virtual browser cloud workspace.

16. The method of claim 10, further comprising:

monitoring network traffic during a recording of the instruction video;

storing whitelisted domains of the network traffic that are related to the network- accessible resource;

monitoring the bidirectional communication; and restricting use of the virtual browser to access the whitelisted domains.

17. A computer system comprising:

at least one memory including instructions; and at least one processor that is operably coupled to the at least one memory and that is arranged and configured to execute the instructions that, when executed, cause the at least one processor to receive, from a client device hosting a browser, a request for a guided project teaching usage of a network-accessible resource, the guided project including an instruction video explaining the usage of the network-accessible resource;

provide, in response to the request, a virtual browser cloud workspace running on a containerized computation environment hosting a virtual browser and remote access software;

provide, at the browser of the client device, an interactive learning environment that includes a virtual browser interactive window and an instructional window;

provide the instruction video within the instructional window;

provide, using the remote access software, bidirectional communication between the virtual browser interactive window and the virtual browser while the virtual browser is accessing the network-accessible resource; and control the network-accessible resource at the virtual browser interactive window to enable completion of the guided project in conjunction with the instruction video.

18. The computer system of claim 17, wherein the instructions are further configured to cause the at least one processor to:

auto-launch the network-accessible resource within the virtual browser in conjunction with providing the virtual browser interactive window.

19. The computer system of claim 17, wherein the instructions are further configured to cause the at least one processor to:

provide the virtual browser cloud workspace with a container file system and container storage for accessing at least one file stored in conjunction with the guided project, using the virtual browser.

20. The computer system of claim 17, wherein the instructions are further configured to cause the at least one processor to:

execute the bidirectional communication using a remote access proxy accessed by both the browser of the client device and the virtual browser cloud workspace.

\* \* \* \* \*